US011951744B2

(12) United States Patent
Koase

(10) Patent No.: US 11,951,744 B2
(45) Date of Patent: Apr. 9, 2024

(54) SWITCHING MECHANISM, FLOW PASSAGE SWITCHING MECHANISM, AND LIQUID EJECTING APPARATUS

(71) Applicant: SEIKO EPSON CORPORATION, Tokyo (JP)

(72) Inventor: Takashi Koase, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 93 days.

(21) Appl. No.: 17/659,520

(22) Filed: Apr. 18, 2022

(65) Prior Publication Data

US 2022/0332122 A1 Oct. 20, 2022

(30) Foreign Application Priority Data

Apr. 19, 2021 (JP) ................................ 2021-070182

(51) Int. Cl.
*B41J 2/165* (2006.01)

(52) U.S. Cl.
CPC ....... *B41J 2/16511* (2013.01); *B41J 2/16523* (2013.01)

(58) Field of Classification Search
CPC ......................... B41J 2/16511; B41J 2/16523; B41J 2/16532; B41J 2/175; B41J 2/17509; B41J 29/13; B41J 29/38; B41J 2/16508
See application file for complete search history.

(56) References Cited

U.S. PATENT DOCUMENTS

2005/0103894 A1 5/2005 Takahashi et al.
2006/0256156 A1* 11/2006 Tanaka ................ B41J 2/16523 347/37
2010/0165039 A1* 7/2010 Tanaka ................ B41J 2/16523 347/30
2010/0253723 A1 10/2010 Nakano et al.

FOREIGN PATENT DOCUMENTS

JP 2002-200774 A 7/2002
JP 2007-093014 A 4/2007
JP 2010-241011 A 10/2010

* cited by examiner

*Primary Examiner* — Sharon Polk
(74) *Attorney, Agent, or Firm* — WORKMAN NYDEGGER

(57) ABSTRACT

A switching mechanism includes a first rotating body that performs forward rotation and reverse rotation by receiving a driving force transmitted from a driving source; and a second rotating body having convex portions provided on an outer circumference at intervals. The first rotating body has an engagement portion configured to move along the outer circumference of the second rotating body. When the first rotating body rotates in a forward direction, engagement of the engagement portion with the convex portion causes rotation of the second rotating body in the forward direction together with the first rotating body. When the first rotating body rotates in a reverse direction, the engagement portion moves along the outer circumference of the second rotating body so that the second rotating body does not rotate in the reverse direction. A first interval, which is at least one of the intervals, is larger than other intervals.

9 Claims, 20 Drawing Sheets

SWITCHING MECHANISM, FLOW PASSAGE SWITCHING MECHANISM, AND LIQUID EJECTING APPARATUS

The present application is based on, and claims priority from JP Application Serial Number 2021-070182, filed Apr. 19, 2021, the disclosure of which is hereby incorporated by reference herein in its entirety.

BACKGROUND

1. Technical Field

Embodiments of the present disclosure relate to a switching mechanism that switches the rotational position of a rotating body, a flow passage switching mechanism including the switching mechanism, and a liquid ejecting apparatus equipped with the flow passage switching mechanism.

2. Related Art

An image forming apparatus disclosed in JP-A-2002-200774 includes a switching mechanism for a rotary valve for selectively connecting a tube to a suction pump depending on a rotational position. The switching mechanism includes a ratchet gear, an arm member, and a ratchet pawl. The ratchet gear is provided integrally on the rotating shaft of the rotary valve. The arm member is pivotally supported on the rotating shaft in such a way as to be able to rotate freely. The ratchet pawl is pivotally supported on the arm member in such a way as to be able to rotate. When the arm member rotates counterclockwise, the ratchet pawl meshes with the ratchet gear to cause counterclockwise rotation of the rotary valve together with the arm member and, therefore, the tube that is connected to the suction pump is switched.

The image forming apparatus disclosed in JP-A-2002-200774 further includes a position indicator provided on the ratchet gear and a position detector for detecting the position indicator. The position detector detects the rotational position of the rotary valve. The arm member is an example of a first rotating body. The ratchet gear is an example of a second rotating body. The ratchet pawl is an example of an engagement portion. The image forming apparatus is an example of a liquid ejecting apparatus.

In the switching mechanism disclosed in JP-A-2002-200774, for a solution to a case where the rotational position of the rotary valve becomes unknown due to an unexpected event, the liquid ejecting apparatus includes a position detector for detecting the rotational position of the rotary valve. This makes the structure of the liquid ejecting apparatus complex.

SUMMARY

A switching mechanism according to a certain aspect of the present disclosure includes: a first rotating body that performs forward rotation and reverse rotation by receiving a driving force transmitted from a driving source; and a second rotating body that rotates around a center of rotation of the first rotating body and has a plurality of convex portions provided on an outer circumference at intervals in a direction of rotation; wherein the first rotating body has an engagement portion configured to move along the outer circumference of the second rotating body, when the first rotating body rotates in a forward direction, engagement of the engagement portion with the convex portion causes rotation of the second rotating body in the forward direction together with the first rotating body, when the first rotating body rotates in a reverse direction, the engagement portion moves along the outer circumference of the second rotating body so that the second rotating body does not rotate in the reverse direction, a rotational position of the second rotating body is switched into a predetermined rotational position by causing the first rotating body, driven by the driving source, to execute forward-and-reverse rotational operation, in which forward rotation and reverse rotation are performed sequentially, a first interval, which is at least one of the intervals, is larger than other intervals, a central angle formed with respect to the center of rotation by two convex portions forming the first interval is defined as a first angle, and largest one of central angles formed with respect to the center of rotation by respective two convex portions forming the other intervals is defined as a second angle, and given above definition, the driving source causes the first rotating body to perform forward-and-reverse rotational operation repeatedly by a rotation angle that is smaller than the first angle and is not smaller than the second angle, thereby positioning the engagement portion into the first interval.

A flow passage switching mechanism according to a certain aspect of the present disclosure includes: the switching mechanism described in the above paragraph; and a rotary valve including a first flow passage and two or more flow passages different from the first flow passage and configured to, by rotating, switch a flow passage that is in communication with the first flow passage between or among the two or more flow passages different from the first flow passage; wherein the rotary valve is configured to rotate together with the second rotating body, and when a predetermined convex portion among the plurality of convex portions of the second rotating body comes to a predetermined position, any one of the two or more flow passages different from the first flow passage becomes in communication with the first flow passage.

A liquid ejecting apparatus according to a certain aspect of the present disclosure includes: a liquid ejecting unit that ejects liquid from nozzles; a supply flow passage through which the liquid is suppled from a liquid container containing the liquid to the liquid ejecting unit; a cap configured to enclose the nozzles to form a closed space for the nozzles inside; a branch flow passage whose one end is connected to a middle of the supply flow passage; a discharge flow passage whose one end is connected to the cap; a driving source; and the flow passage switching mechanism described in the above paragraph; wherein other end of the branch flow passage is connected to a second flow passage among the two or more flow passages different from the first flow passage, and other end of the discharge flow passage is connected to a third flow passage among the two or more flow passages different from the first flow passage.

DESCRIPTION OF EXEMPLARY EMBODIMENTS

With reference to the accompanying drawings, a switching mechanism, a flow passage switching mechanism, and a liquid ejecting apparatus according to first and second embodiments will now be explained. A liquid ejecting apparatus according to the embodiments of the present disclosure is an ink-jet printer that prints characters and an image, etc. by ejecting liquid such as ink onto a medium such as paper.

First Embodiment

Configuration of Multifunction Printer

Figure 1:
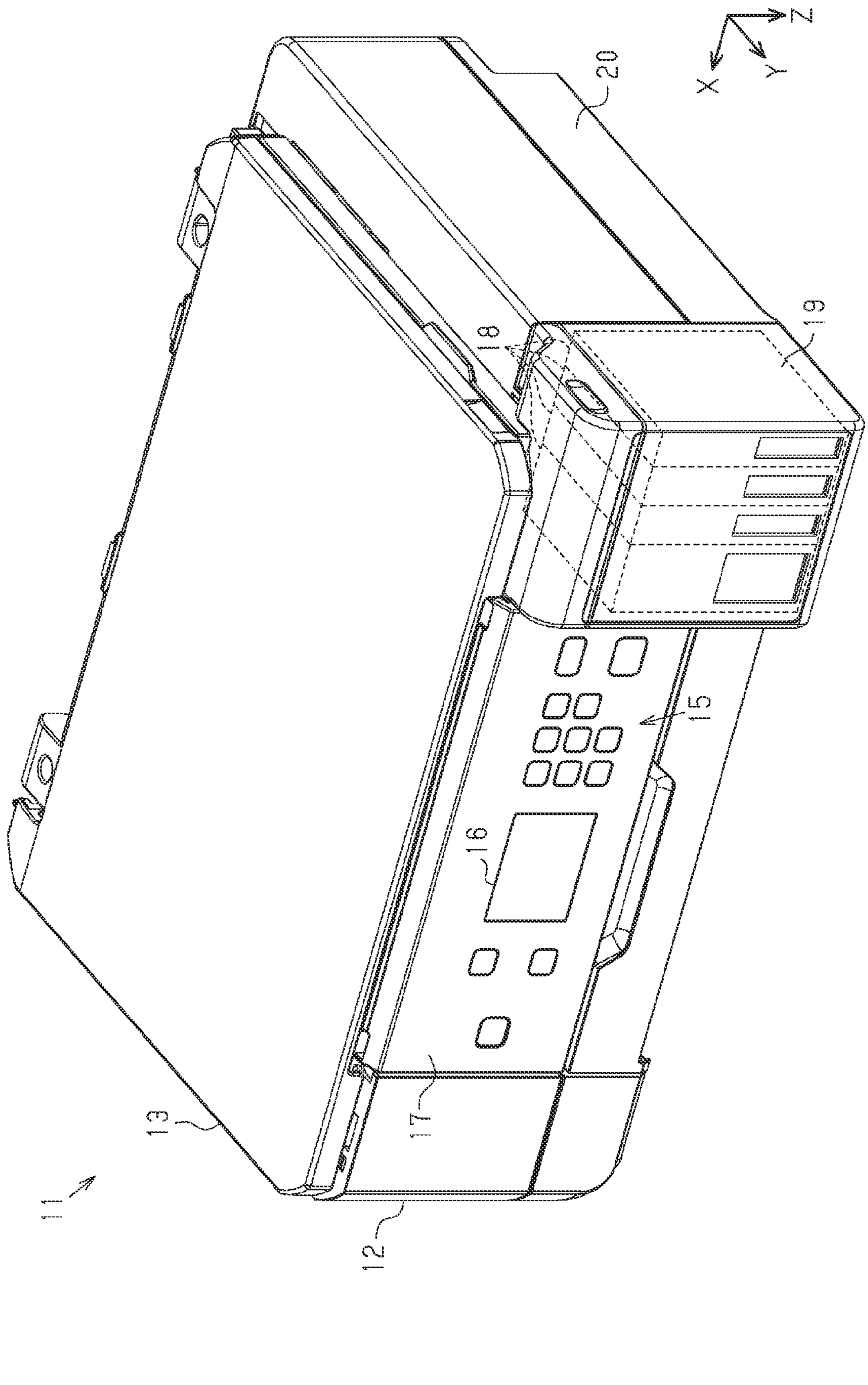
FIG. 1 is a perspective view of a multifunction printer that includes a liquid ejecting apparatus according to a first, a second embodiment.

As illustrated in FIG. 1, a multifunction printer 11 includes a liquid ejecting apparatus 12 and an image reading apparatus 13. The image reading apparatus 13 is disposed on top of the liquid ejecting apparatus 12. The top of the liquid ejecting apparatus 12 is covered by the image reading apparatus 13. The multifunction printer 11 has a shape of a substantially rectangular parallelepiped as a whole.

In FIG. 1, it is assumed that the multifunction printer 11 is installed on a horizontal plane, and, based on this assumption, the direction of gravity is indicated by a Z axis, and directions along a horizontal plane perpendicular to the direction of gravity are indicated by an X axis and a Y axis. The X, Y, and Z axes intersect with one another. In the present embodiment, the X, Y, and Z axes are orthogonal to one another. In the description below, the direction along the X axis will be referred to as a scanning direction X, the direction along the Y axis will be referred to as a transportation direction Y, and the direction along the Z axis will be referred to as a vertical direction Z.

An operation panel 17 is provided on the front of the liquid ejecting apparatus 12. The operation panel 17 includes an operation unit 15 and a display unit 16. The operation unit 15 includes, for example, buttons for performing various manipulations on the multifunction printer 11. The display unit 16 displays information of the liquid ejecting apparatus 12 and the multifunction printer 11, etc. A holder 19 configured to hold at least one liquid container 18 is provided to the right of the operation panel 17. The holder 19 constitutes a part of a cabinet 20. At least one liquid container 18 mentioned here is housed inside it.

Configuration of Liquid Ejecting Apparatus

Figure 2:
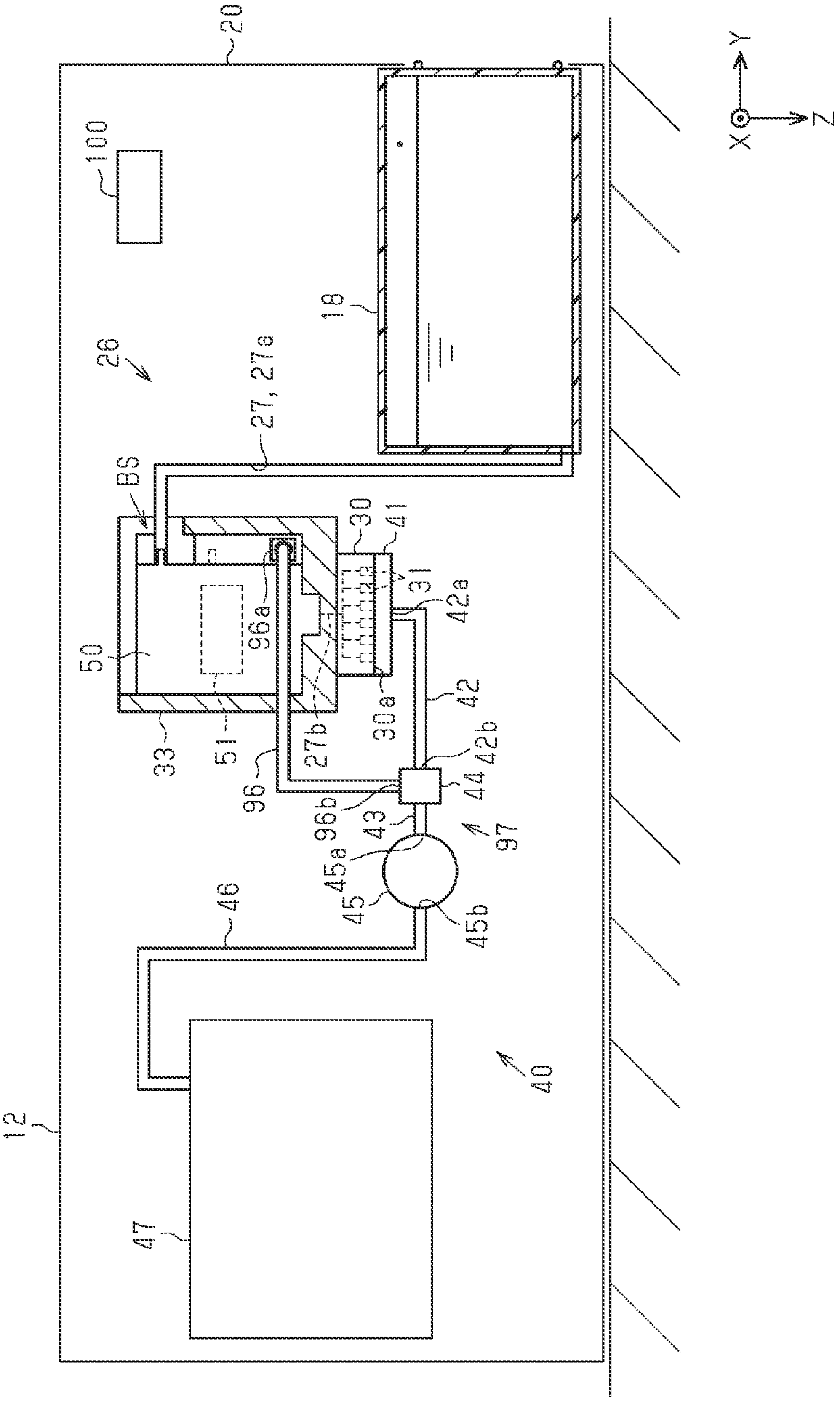
FIG. 2 is a schematic side sectional view of a liquid ejecting apparatus that includes a flow passage switching mechanism.

As illustrated in FIG. 2, the liquid ejecting apparatus 12 includes a liquid ejecting unit 30, which ejects liquid from nozzles 31, a liquid reservoir unit 50, an air bubble discharging mechanism BS, and a carriage 33, which is able to reciprocate in the scanning direction X. The liquid ejecting unit 30, the liquid reservoir unit 50, and the air bubble discharging mechanism BS are mounted on the carriage 33. The liquid reservoir unit 50 has a reservoir chamber 51, inside which liquid supplied from the liquid container 18 to the liquid ejecting unit 30 can be temporarily contained. The air bubble discharging mechanism BS is able to let out air present in the upper space of the reservoir chamber 51 of the liquid reservoir unit 50.

The liquid ejecting apparatus 12 includes a liquid supply device 26. Liquid contained in the liquid container 18 is supplied therefrom to the liquid ejecting unit 30 by the liquid supply device 26. The liquid supply device 26 includes a supply flow passage 27, through which the liquid is suppled from the liquid container 18 to the liquid ejecting unit 30, and the liquid reservoir unit 50, which is provided somewhere on, and between the ends of, the supply flow passage 27. The supply flow passage 27 includes a first supply passage 27*a* and a second supply passage 27*b*. The first supply passage 27*a* is a portion located upstream of the liquid reservoir unit 50. The second supply passage 27*b* is a portion located downstream of the liquid reservoir unit 50. The second supply passage 27*b* is provided on the carriage 33. Liquid contained in the liquid reservoir unit 50 is sent to the liquid ejecting unit 30 through the second supply passage 27*b*.

The liquid ejecting apparatus 12 includes a maintenance device 40, which performs maintenance on the liquid ejecting unit 30. The maintenance device 40 includes a cap 41, which is able to move in relation to the liquid ejecting unit 30, and a discharge flow passage 42, which is connected to the cap 41. The cap 41 is located below the liquid ejecting unit 30. The cap 41 is able to receive liquid ejected or discharged from the nozzles 31 of the liquid ejecting unit 30 for the purpose of maintenance.

The cap 41 is able to move between a retracted position and a capping position. The retracted position is a position away from the liquid ejecting unit 30. The capping position is a position where the cap 41 is in contact with a nozzle surface 30*a*, in which orifices of the nozzles 31 of the liquid ejecting unit 30 are formed. When located at the capping position, the cap 41 forms, with the nozzle surface 30*a*, a closed space for the orifices of the nozzles 31. That is, the cap 41 is able to enclose the nozzles 31 to form the closed space inside.

The maintenance device 40 includes a pump 45, specifically, a suction pump. The liquid ejecting apparatus 12 includes a discharge collection flow passage 46, a waste liquid container 47 for containing waste liquid collected through the discharge collection flow passage 46, a flow passage switching mechanism 44 for selectively switching the flow passage connected to the discharge collection flow passage 46, and a driving source for driving the pump 45 and the flow passage switching mechanism 44. The upstream end of the discharge collection flow passage 46 is connected to the other end 45*b* of the pump 45. Through this connection, the discharge collection flow passage 46 is in communication with the pump 45. The downstream end of the discharge collection flow passage 46 is connected to the waste liquid container 47. Through this connection, the discharge collection flow passage 46 is in communication with the waste liquid container 47. One end 45*a* of the pump 45 is connected via a tube 43 to the flow passage switching mechanism 44. Through this connection, the pump 45 is in communication with the flow passage switching mechanism 44. This means that the waste liquid container 47 and the flow passage switching mechanism 44 are in communication with each other.

Communication between the flow passage switching mechanism 44 and the cap 41 is provided by the discharge flow passage 42. One end 42*a* of the discharge flow passage 42 is connected to the cap 41. The maintenance device 40 includes a branch flow passage 96 branching off from the supply flow passage 27. Communication between the flow passage switching mechanism 44 and the air bubble discharging mechanism BS is provided by the branch flow passage 96. One end 96*a* of the branch flow passage 96 is connected to the middle of the supply flow passage 27. The other end 42*b* of the discharge flow passage 42 and the other end 96*b* of the branch flow passage 96 are connected to the flow passage switching mechanism 44. The flow passage switching mechanism 44 performs selective switching among a state in which the discharge collection flow passage 46 is connected to the discharge flow passage 42, a state in which the discharge collection flow passage 46 is connected to the branch flow passage 96, and a state in which the discharge collection flow passage 46 is connected to neither of these two flow passages. The liquid ejecting apparatus 12 includes a suction device 97, which generates negative pressure configured to act on the flow passage connected to the discharge collection flow passage 46. The suction device 97 utilizes the pump 45 of the maintenance device 40 as its negative pressure source.

When the discharge collection flow passage 46 is connected to the discharge flow passage 42, the maintenance device 40 drives the pump 45, with the liquid ejecting unit 30 capped. As a result, negative pressure is introduced into a closed space formed between the cap 41 and the nozzle surface 30*a*. By this suction, the maintenance device 40 causes any foreign object such as air bubbles present in the liquid contained in the liquid ejecting unit 30 to be discharged from the nozzles 31 together with the liquid and be sent to the waste liquid container 47.

When the discharge collection flow passage 46 is connected to the branch flow passage 96, the maintenance device 40 drives the pump 45 to introduce negative pressure into the upper portion of the reservoir chamber 51 of the liquid reservoir unit 50 via the air bubble discharging mechanism BS. If there is any air bubble in the upper portion of the reservoir chamber 51, the air bubble is sucked through the branch flow passage 96 due to the introduction of the negative pressure and is thus removed from the reservoir chamber 51. Then, the liquid containing the air bubble is sent to the waste liquid container 47.

The operation of the flow passage switching mechanism 44 to switch the rotational position of a non-illustrated rotary valve is controlled by a control unit 100. The rotary valve is switchable among a plurality of switching positions, including a switching position at which negative pressure applied from the pump 45 is introduced into the reservoir chamber 51 of the liquid reservoir unit 50 via the air bubble discharging mechanism BS and a switching position at which negative pressure applied from the pump 45 is introduced into the cap 41. The flow passage switching mechanism 44 will now be described in detail below.

Structure of Flow Passage Switching Mechanism

Figure 3:
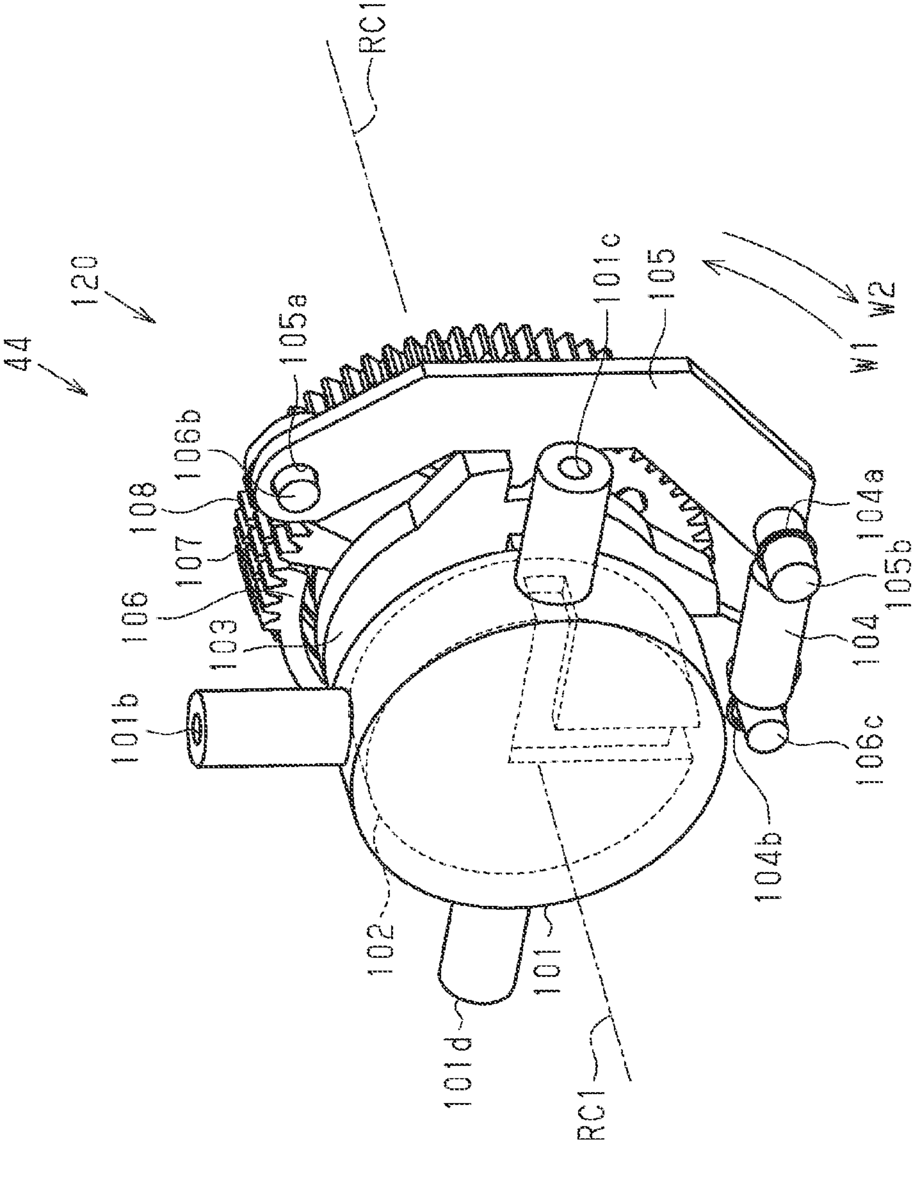
FIG. 3 is a perspective view illustrating the structure of a flow passage switching mechanism according to the first embodiment.
Figure 4:
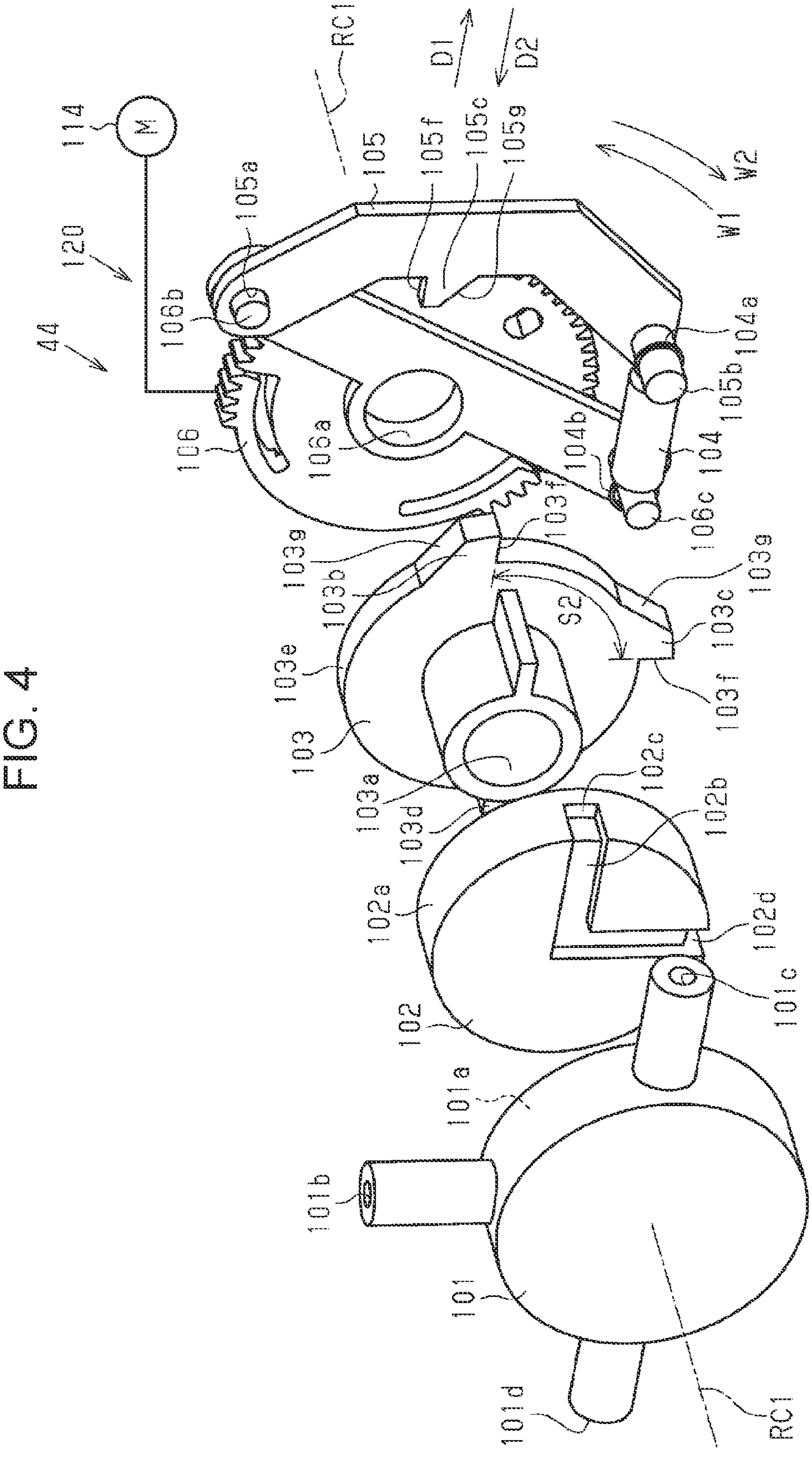
FIG. 4 is an exploded perspective view illustrating the structure of the flow passage switching mechanism according to the first embodiment.

As illustrated in FIG. 3, the flow passage switching mechanism 44 includes a rotary valve 102. The rotary valve 102 includes a housing 101, which is a fixed portion. The housing 101 includes a first flow passage 101*b* and two or more flow passages different from the first flow passage 101*b*. In other words, the rotary valve 102 includes the first flow passage 101*b* and two or more flow passages different from the first flow passage 101*b*. An outer circumferential surface 102*a* illustrated in FIG. 4 is fitted rotatably in an inner circumferential surface 101*a* illustrated in FIG. 4. This structure enables the rotational portion of the rotary valve 102 to rotate in relation to the housing 101. "The rotary valve 102 rotates" herein means that the rotational portion of the rotary valve 102 rotates in relation to the housing 101, which is a fixed portion. In the present embodiment, the rotary valve 102 includes the first flow passage 101*b*, a second flow passage 101*c*, and a third flow passage 101*d*. Namely, the rotary valve 102 includes the first flow passage 101*b* and two flow passages 101*c* and 101*d* different from the first flow passage 101*b*.

The rotary valve 102 rotates around the center of rotation RC1. By this rotation, the flow passage switching mechanism 44 is able to switch the flow passage that is in communication with the first flow passage 101*b* between or among the two or more flow passages different from the first flow passage 101*b*. In the present embodiment, the flow passage switching mechanism 44 switches the flow passage that is in communication with the first flow passage 101*b* between the second flow passage 101*c* and the third flow passage 101*d*.

Since the first flow passage 101*b* and the one end 45*a* of the pump 45 are connected to each other via the tube 43 illustrated in FIG. 2, the one end 45*a* of the pump 45 is in communication with the first flow passage 101*b*. The other end 96*b* of the branch flow passage 96 illustrated in FIG. 2 is connected to the second flow passage 101*c*, which is one of the two or more flow passages different from the first flow passage 101*b*. The other end 42*b* of the discharge flow passage 42 illustrated in FIG. 2 is connected to the third flow passage 101*d*, which is the other, or another one, of the two or more flow passages different from the first flow passage 101*b*.

As illustrated in FIG. 4, the flow passage switching mechanism 44 includes a switching mechanism 120. The switching mechanism 120 includes a first rotating body 106. The first rotating body 106 performs forward rotation and reverse rotation by receiving a driving force transmitted from a driving source 114, the rotation angle of which is controlled by the control unit 100 illustrated in FIG. 2. How the driving force is transmitted from the driving source 114 to the first rotating body 106 will be described later. The switching mechanism 120 further includes a second rotating body 103. The second rotating body 103 rotates around the center of rotation RC1 of the first rotating body 106. The second rotating body 103 has a plurality of convex portions provided on its outer circumference 103*e* at intervals in the direction of rotation. In the present embodiment, three convex portions 103*b*, 103*c*, and 103*d* are provided on the outer circumference 103*e* of the second rotating body 103 at intervals in the direction of rotation. The switching mechanism 120 switches the rotational position of the second rotating body 103 into a predetermined rotational position. The switching operation of the switching mechanism 120 will be described later.

The inner circumferential surface 106*a* of the first rotating body 106 and the inner circumferential surface 103*a* of the second rotating body 103 are fitted rotatably on a non-illustrated central shaft. Because of this structure, the first rotating body 106 and the second rotating body 103 are able to rotate separately from each other around the same center of rotation RC1.

The first rotating body 106 includes an engagement member 105. The engagement member 105 has a hole portion 105*a*. The first rotating body 106 has a shaft portion 106*b*. The hole portion 105*a* is fitted rotatably on the shaft portion 106*b*. Therefore, the engagement member 105 is able to rotate around the shaft portion 106*b*. The engagement member 105 further has an engagement portion 105*c*. The first rotating body 106 includes a first urging member 104. The first urging member 104 urges the engagement portion 105*c* toward the outer circumference 103*e* of the second rotating body 103. That is, the first rotating body 106 includes the engagement portion 105*c* that is able to move along the outer circumference 103*e* of the second rotating body 103.

As illustrated in FIG. 4, the engagement portion 105*c* has a side surface 105*f* and a sloped surface 105*g*. Each of the convex portions 103*b*, 103*c*, and 103*d* has a side surface 103*f* and a sloped surface 103*g*. When the first rotating body 106 rotates in a forward direction W1, the side surface 105*f* comes into contact with the side surface 103*f* as illustrated in FIG. 3. When the first rotating body 106 further rotates in the forward direction W1, a pushing force acts on the side surface 103*f* in a direction perpendicular thereto, and a reactive force acts in a direction perpendicular to the side surface 105*f* Since both the side surface 105*f* and the side surface 103*f* extend in a radial direction with respect to the center of rotation RC1, the reactive force does not include a component that causes the engagement member 105 to rotate to go in a direction D1 away from the center of rotation RC1. Therefore, the side surface 105*f* pushes the side surface 103*f* while the side surface 105*f* remains in contact with the side surface 103*f*, and, due to the pushing force, the first rotating body 106 causes the second rotating body 103 to rotate. The state in which the side surface 105*f* is in contact with the side surface 103*f* will be referred to as follows: "the engagement portion 105*c* is in engagement with the convex portion 103*b*, 103*c*, 103*d*". That is, when the first rotating body 106 rotates in the forward direction W1, the engagement of the engagement portion 105*c* with the convex portion 103*b*, 103*c*, 103*d* causes the rotation of the second rotating body 103 in the forward direction W1 together with the first rotating body 106. Continuous rotation and intermittent rotation in the forward direction W1 will be referred to as forward rotation.

As illustrated in FIG. 4, when the first rotating body 106 rotates in a reverse direction W2, the sloped surface 105*g* comes into contact with the sloped surface 103*g*. When the first rotating body 106 further rotates in the reverse direction W2, a pushing force acts on the sloped surface 103*g* in a direction perpendicular thereto, and a reactive force acts in a direction perpendicular to the sloped surface 105*g*. Since both the sloped surface 105*g* and the sloped surface 103*g* are inclined from a plane extending in the radial direction with respect to the center of rotation RC1, the reactive force includes a component that causes the engagement member 105 to rotate to go in the direction D1 away from the center of rotation RC1. For this reason, the engagement portion 105*c* moves along the sloped surface 103*g* to go in the direction D1 away from the center of rotation RC1, and the first rotating body 106 does not cause the rotation of the second rotating body 103. When the first rotating body 106 further rotates in the reverse direction W2, the engagement portion 105*c* moves along the side surface 103*f* in a direction D2, thereby coming closer to the center of rotation RC1. That is, when the first rotating body 106 rotates in the reverse direction W2, the engagement portion 105*c* moves along the outer circumference 103*e* of the second rotating body 103 so that the second rotating body 103 will not rotate in the reverse direction W2. Continuous rotation and intermittent rotation in the reverse direction W2 will be referred to as reverse rotation.

The rotary valve 102 is able to rotate together with the second rotating body 103. Therefore, the flow passage switching mechanism 44 is configured such that the rotary valve 102 will not rotate in relation to the housing 101 when the engagement portion 105*c* moves along the outer circumference 103*e* of the second rotating body 103. More specifically, the rotation torque of the rotary valve 102 and the housing 101 is set to be larger than a rotation torque applied to the second rotating body 103 when the engagement portion 105*c* climbs along the sloped surface 103*g* to get over the convex portion 103*b*, 103*c*, 103*d*.

In the present embodiment, the first urging member 104 is a tension spring that has a hook 104*a* on one end and a hook 104*b* on the other end. The hook 104*b* is hooked on a hooking portion 106*c* of the first rotating body 106. The hook 104*a* is hooked on a hooking portion 105*b* of the engagement member 105. Because of this structure, the engagement portion 105*c* is urged toward the outer circumference 103*e* of the second rotating body 103. Alternatively, the engagement portion 105*c* may be urged toward the outer circumference 103*e* of the second rotating body 103 by a compression spring.

The rotary valve 102 rotates together with the second rotating body 103 in a state in which the engagement portion 105*c* is in engagement with predetermined one of the plurality of convex portions 103*b*, 103*c*, and 103*d*. When the predetermined convex portion comes to a predetermined position as a result of this rotation, any one of the two or more flow passages different from the first flow passage 101*b* becomes in communication with the first flow passage 101*b*. Therefore, the convex portions 103*b*, 103*c*, and 103*d* are provided at respective positions corresponding to the switching positions of the rotary valve 102.

In the present embodiment, when the convex portion 103*b* comes to the position of the first flow passage 101*b* illustrated in FIG. 4 as a result of rotation of the rotary valve 102 together with the second rotating body 103 in a state in which the engagement portion 105*c* is in engagement with the convex portion 103*b*, the first flow passage 101*b* and the second flow passage 101*c* become in communication with each other. More specifically, the first flow passage 101*b* becomes in communication with a groove end 102*c* located at the outer circumferential surface 102*a*, the second flow passage 101*c* becomes in communication with a groove end 102*d* located at the outer circumferential surface 102*a*, and the first flow passage 101*b* and the second flow passage 101*c* become in communication with each other through a groove 102*b* of the rotary valve 102. When the convex portion 103*c* comes to the position of the first flow passage 101*b* illustrated in FIG. 4 as a result of further rotation of the rotary valve 102 together with the second rotating body 103 in a state in which the engagement portion 105*c* is in engagement with the convex portion 103*c*, the first flow passage 101*b* and the third flow passage 101*d* become in communication with each other.

When the convex portion 103*d* comes to the position of the first flow passage 101*b* illustrated in FIG. 4 as a result of further rotation of the rotary valve 102 together with the second rotating body 103 in a state in which the engagement portion 105*c* is in engagement with the convex portion 103*d*, the first flow passage 101*b* becomes not in communication with any of the flow passages. That is, the switching may include a case where the first flow passage 101*b* becomes in communication with neither of the flow passages 101*c* and 101*d* different from the first flow passage 101*b* when a predetermined convex portion comes to a predetermined position as a result of rotation of the rotary valve 102 together with the second rotating body 103 in a state in which the engagement portion 105*c* is in engagement with the predetermined convex portion.

The rotary valve 102 may be configured such that the outer circumferential surface 102*a* will block the flow passages except for the one that is in communication with the first flow passage 101*b* when the rotary valve 102 rotated together with the second rotating body 103 comes to a predetermined rotational position. Even if the flow passage switching mechanism 44 includes three or more flow passages different from the first flow passage 101*b*, by configuring the rotary valve 102 such that the outer circumferential surface 102*a* will block these flow passages except for the predetermined one that is in communication with the first flow passage 101*b*, it is possible to provide communication between the first flow passage 101*b* and the predetermined one of these flow passages.

Arrangement of Convex Portions

Figure 5:
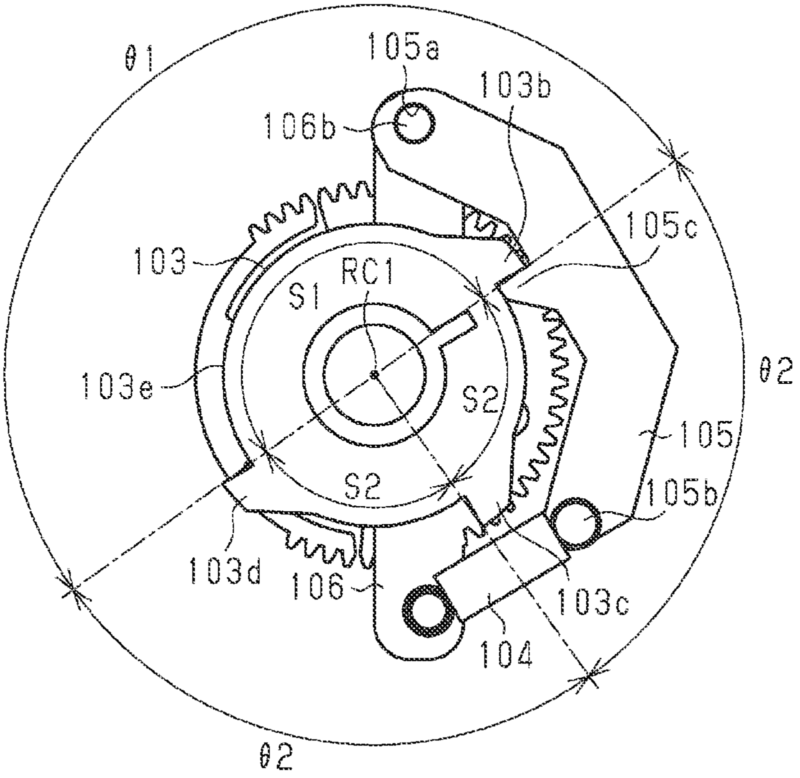
FIG. 5 is a front view illustrating the structure of a switching mechanism.

As illustrated in FIG. 5, the plural convex portions of the second rotating body 103 are provided on the outer circumference 103*e* at intervals in the direction of rotation. A first interval S1, which is at least one of these intervals, is larger than other intervals. In the present embodiment, one first interval S1 is larger than each of two intervals other than this one, specifically, than each of second intervals S2. The convex portion 103*b* and the convex portion 103*c* form the second interval S2. The convex portion 103*c* and the convex portion 103*d* form the second interval S2. The convex portion 103*d* and the convex portion 103*b* form the first interval S1. In this specification, the interval between convex portions in the direction of rotation of the second rotating body 103 means the interval from the side surface 103*f* of one convex portion to the side surface 103*f* of another convex portion illustrated in FIG. 4.

A central angle formed with respect to the center of rotation RC1 by two convex portions forming the first interval S1 is defined as a first angle $\theta 1$. The largest one of central angles formed with respect to the center of rotation RC1 by respective two convex portions forming other intervals is defined as a second angle $\theta 2$. The other intervals are smaller than the first interval S1. In the present embodiment, the central angle formed with respect to the center of rotation RC1 by the convex portion 103*d* and the convex portion 103*b* forming the first interval S1 is the first angle $\theta 1$. The central angle formed with respect to the center of rotation RC1 by the convex portion 103*b* and the convex portion 103*c* forming the second interval S2 is the second angle $\theta 2$. The central angle formed with respect to the center of rotation RC1 by the convex portion 103*c* and the convex portion 103*d* forming the second interval S2 is also the second angle $\theta 2$.

Switching Operation

Figure 6:
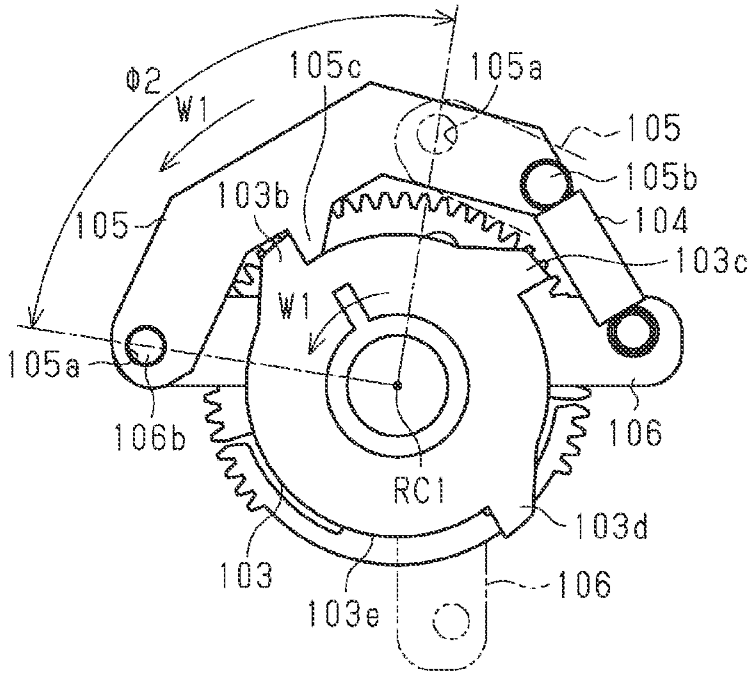
FIG. 6 is a front view illustrating a state of forward rotation of a first rotating body by a second rotation angle.
Figure 7:
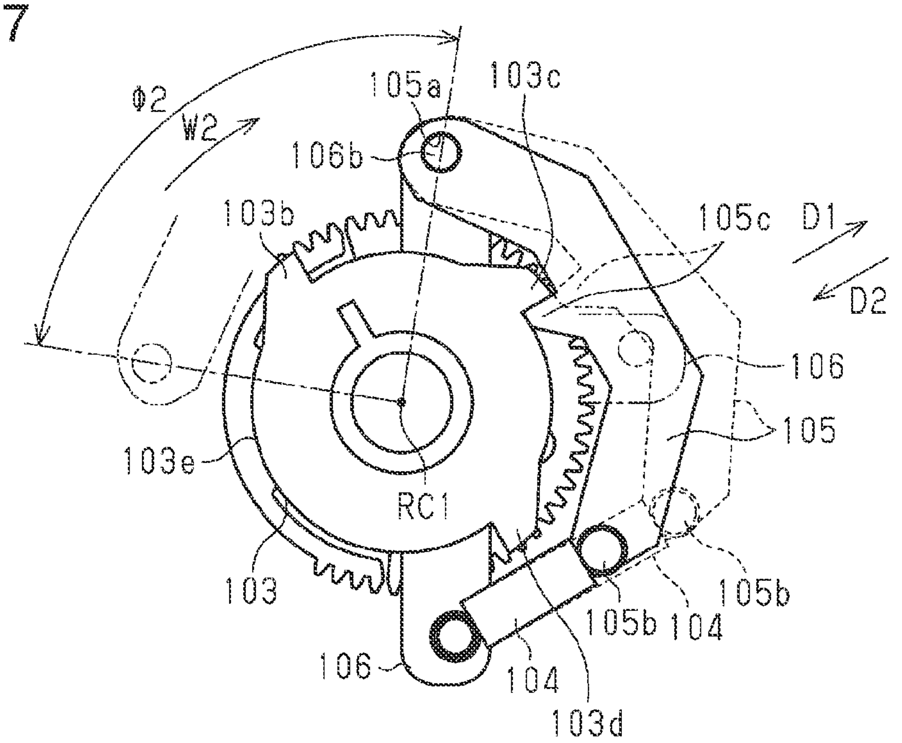
FIG. 7 is a front view illustrating a state of reverse rotation of the first rotating body by the second rotation angle.

As illustrated in FIG. 5, switching operation is started at the switching mechanism 120. For example, with the engagement portion 105*c* engaged with the convex portion 103*b*, the first rotating body 106 located at the position illustrated in FIG. 5 rotates together with the second rotating body 103 in the forward direction W1 by a second rotation angle $\Phi 2$ illustrated in FIG. 6, and, as a result, comes to the position illustrated in FIG. 6. More specifically, as illustrated in FIG. 6, since the engagement portion 105*c* pushes the convex portion 103*b*, the first rotating body 106 causes the second rotating body 103 to rotate to a predetermined rotational position. Then, the first rotating body 106 located at the position illustrated in FIG. 6 rotates in the reverse direction W2 by the second rotation angle $\Phi 2$ illustrated in FIG. 7, which is the same angle of rotation as that of the forward rotation. As a result of this reverse rotation, the first rotating body 106 only comes to the position illustrated in FIG. 7. In this process, as illustrated in FIG. 7, since the engagement portion 105*c* moves in the direction D1 away from the center of rotation RC1, the engagement portion 105*c* climbs over the convex portion 103*c*. The second rotation angle $\Phi 2$ is the same angle of rotation as the second angle $\theta 2$, which is the central angle formed with respect to the center of rotation RC1 by the convex portion 103*b* and the convex portion 103*c*. When the switching operation described above is performed, the switching mechanism 120 changes from the state illustrated in FIG. 5, in which the engagement portion 105*c* is in engagement with the convex portion 103*b*, to the state illustrated in FIG. 7, in which the engagement portion 105*c* is in engagement with the convex portion 103*c*. Then, the switching operation ends.

That is, the switching mechanism 120 causes the rotary valve 102 illustrated in FIG. 4 to rotate in the forward direction W1 by the second rotation angle Φ2, and, in addition, changes from the state in which the engagement portion 105*c* is in engagement with the convex portion 103*b* to the state in which the engagement portion 105*c* is in engagement with the convex portion 103*c*. Assuming that the first flow passage 101*b* illustrated in FIG. 4 is in communication with neither of the flow passages because the rotary valve 102 is located at the rotational position illustrated in FIG. 4 in a switching operation start state illustrated in FIG. 5, the first flow passage 101*b* illustrated in FIG. 4 will be in communication with the second flow passage 101*c* in a switching operation end state illustrated in FIG. 7. The second rotation angle Φ2 is set such that the first flow passage 101*b* illustrated in FIG. 4 will be in communication with the second flow passage 101*c* in the switching operation end state illustrated in FIG. 7. The switching mechanism 120 switches the rotational position of the second rotating body 103 into a predetermined rotational position in this way, thereby switching the flow passage that is in communication with the first flow passage 101*b*.

Figure 8:
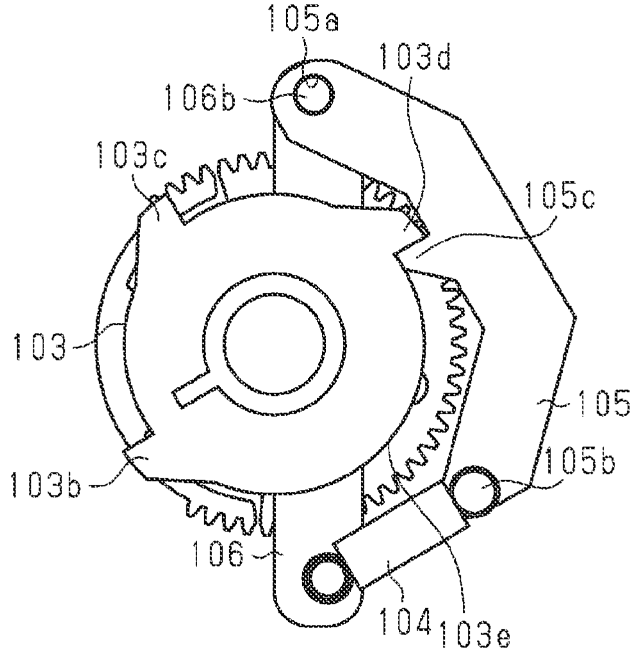
FIG. 8 is a front view illustrating a state after reverse rotation of the first rotating body by the second rotation angle.

By performing the switching operation again, the switching mechanism 120 changes from the state illustrated in FIG. 7, in which the engagement portion 105*c* is in engagement with the convex portion 103*c*, to the state illustrated in FIG. 8, in which the engagement portion 105*c* is in engagement with the convex portion 103*d*. Assuming that the first flow passage 101*b* illustrated in FIG. 4 is in communication with the second flow passage 101*c* in a switching operation start state, the first flow passage 101*b* illustrated in FIG. 4 will be in communication with the third flow passage 101*d* in a switching operation end state. The second rotation angle Φ2 is set such that the first flow passage 101*b* illustrated in FIG. 4 will be in communication with the third flow passage 101*d* in the switching operation end state. The switching mechanism 120 switches the rotational position of the second rotating body 103 into a predetermined rotational position in this way, thereby switching the flow passage that is in communication with the first flow passage 101*b*.

Figure 9:
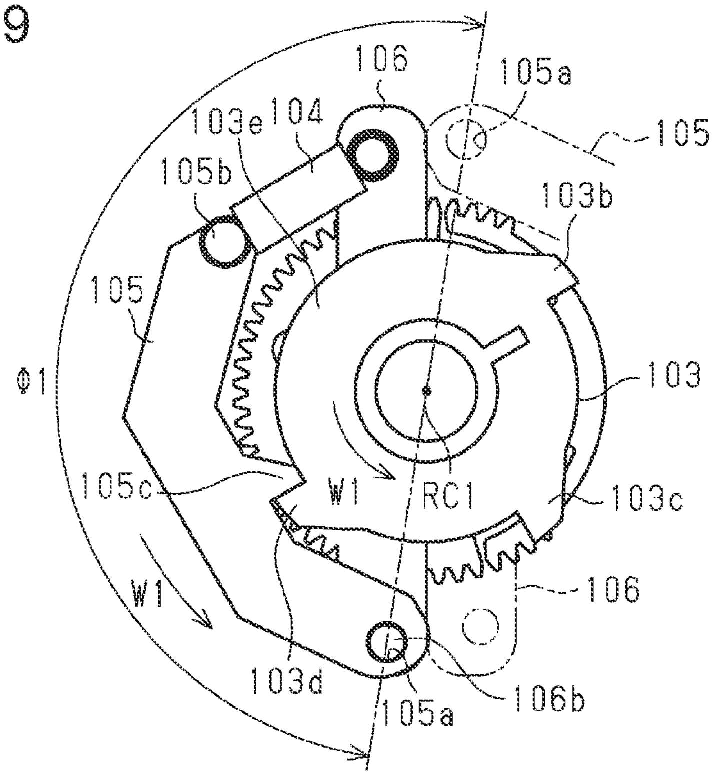
FIG. 9 is a front view illustrating a state of forward rotation of the first rotating body by a first rotation angle.
Figure 10:
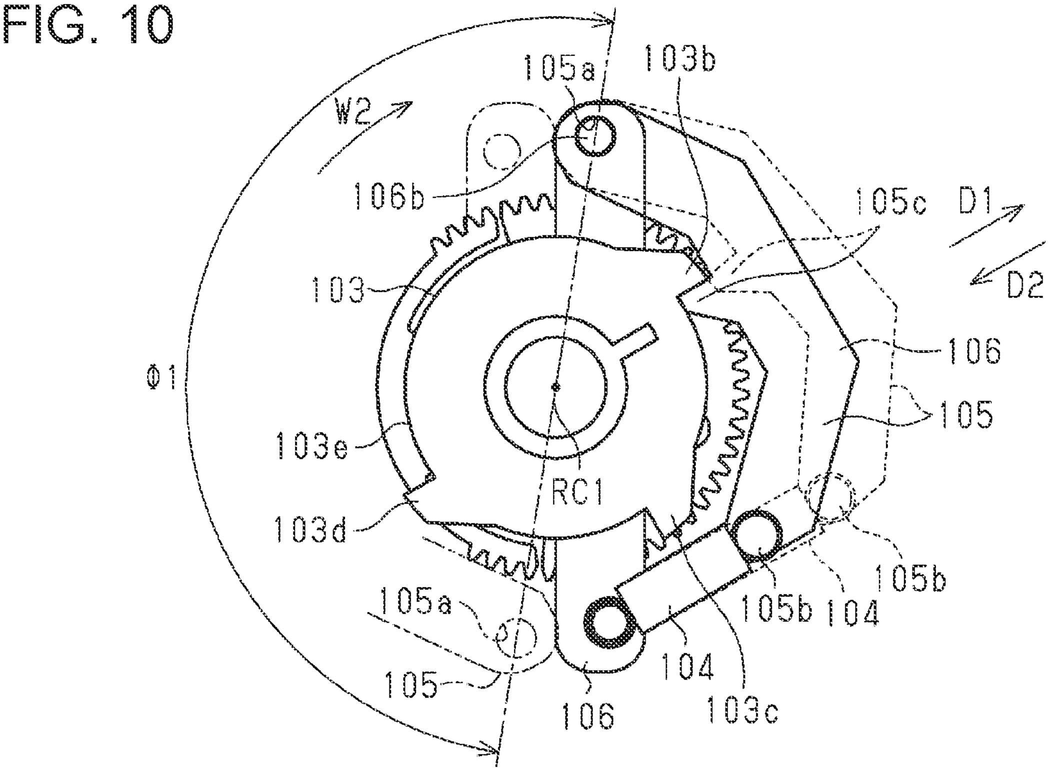
FIG. 10 is a front view illustrating a state of reverse rotation of the first rotating body by the first rotation angle.

By further performing the switching operation from the state illustrated in FIG. 8, the switching mechanism 120 changes from the state illustrated in FIG. 8, in which the engagement portion 105*c* is in engagement with the convex portion 103*d*, to the state illustrated in FIG. 10, in which the engagement portion 105*c* is in engagement with the convex portion 103*b*. With the engagement portion 105*c* engaged with the convex portion 103*d*, the first rotating body 106 located at the position illustrated in FIG. 8 rotates together with the second rotating body 103 in the forward direction W1 by a first rotation angle Φ1 illustrated in FIG. 9. This rotation brings the second rotating body 103 to the position illustrated in FIG. 9. Then, the first rotating body 106 located at the position illustrated in FIG. 9 rotates in the reverse direction W2 by the first rotation angle Φ1 illustrated in FIG. 10, which is the same angle of rotation as that of the forward rotation. As a result of this reverse rotation, the first rotating body 106 only comes to the position illustrated in FIG. 10. Assuming that the first flow passage 101*b* illustrated in FIG. 4 is in communication with the third flow passage 101*d* in a switching operation start state, the first flow passage 101*b* illustrated in FIG. 4 will be in communication with neither of the flow passages in a switching operation end state. The first rotation angle Φ1 is set such that the first flow passage 101*b* illustrated in FIG. 4 will be in communication with neither of the flow passages in the switching operation end state and such that the switching mechanism 120 will return to the original state illustrated in FIG. 5, from which the initial switching operation was started. That is, by repeating the switching operation, the switching mechanism 120 returns to the original state illustrated in FIG. 5, from which the initial switching operation was started. The switching mechanism 120 switches the rotational position of the second rotating body 103 into a predetermined rotational position in this way, thereby switching the flow passage that is in communication with the first flow passage 101*b*.

As described above, the switching mechanism 120 switches the rotational position of the second rotating body 103 into a predetermined rotational position by causing its first rotating body 106, driven by the driving source 114 illustrated in FIG. 4, to execute forward-and-reverse rotational operation, in which forward rotation and reverse rotation are performed sequentially. In the description below, the operation of performing forward rotation and reverse rotation sequentially will be simply referred to as "forward-and-reverse rotational operation". The minimum unit of operation in the forward-and-reverse rotational operation is forward rotation performed once and reverse rotation performed once.

In the switching operation, the rotation angle of forward rotation in forward-and-reverse rotational operation and the rotation angle of reverse rotation in the forward-and-reverse rotational operation do not necessarily have to be the same rotation angle. For example, when reverse rotation is performed, an angle of rotation that is larger than that of the forward rotation having been performed immediately before this reverse rotation may be set. More exactly, the engagement portion 105*c* after reverse rotation may be located at a position separated from the predetermined convex portion in the reverse direction W2 as long as the engagement portion 105*c* moving during the process of the reverse rotation climbs over the predetermined convex portion but does not climb over the next convex portion located on the reverse-directional W2 side beyond the predetermined convex portion. Even if this is the case, the engagement portion 105*c* comes into engagement with the predetermined convex portion when the next forward rotation is performed. Therefore, the engagement portion 105*c* pushes the predetermined convex portion in the forward direction W1, and the first rotating body 106 rotates together with the second rotating body 103 in the forward direction W1. By setting such a rotation angle that will bring the second rotating body 103 to a predetermined rotational position in this forward rotation, it is possible to switch the rotational position of the second rotating body 103 into the predetermined rotational position. However, for simple control of forward-and-reverse rotational operation, it will be preferable if, in the switching operation, the rotation angle of forward rotation in forward-and-reverse rotational operation and the rotation angle of reverse rotation in the forward-and-reverse rotational operation are the same rotation angle, as in the present embodiment.

Origin-Finding Operation

Origin-finding operation will now be explained. The origin-finding operation is operation for positioning the second rotating body 103 to a predetermined rotational position by the switching mechanism 120 when the rotational position of the rotary valve 102 becomes unknown. The origin-finding operation is performed in the order of first operation, and second operation next. In the first operation, the engagement portion 105*c* is put into the first interval S1. In the second operation, starting from a state in which the engagement portion 105*c* is located within the first interval S1, the second rotating body 103 is positioned to a predetermined rotational position. For example, if the rotational position of the rotary valve 102 becomes unknown due to an unexpected event, the origin-finding operation is performed, thereby positioning the second rotating body 103 configured to rotate together with the rotary valve 102 to a predetermined rotational position.

First, the first operation for putting the engagement portion 105*c* into the first interval S1 will now be explained.

Figure 11:
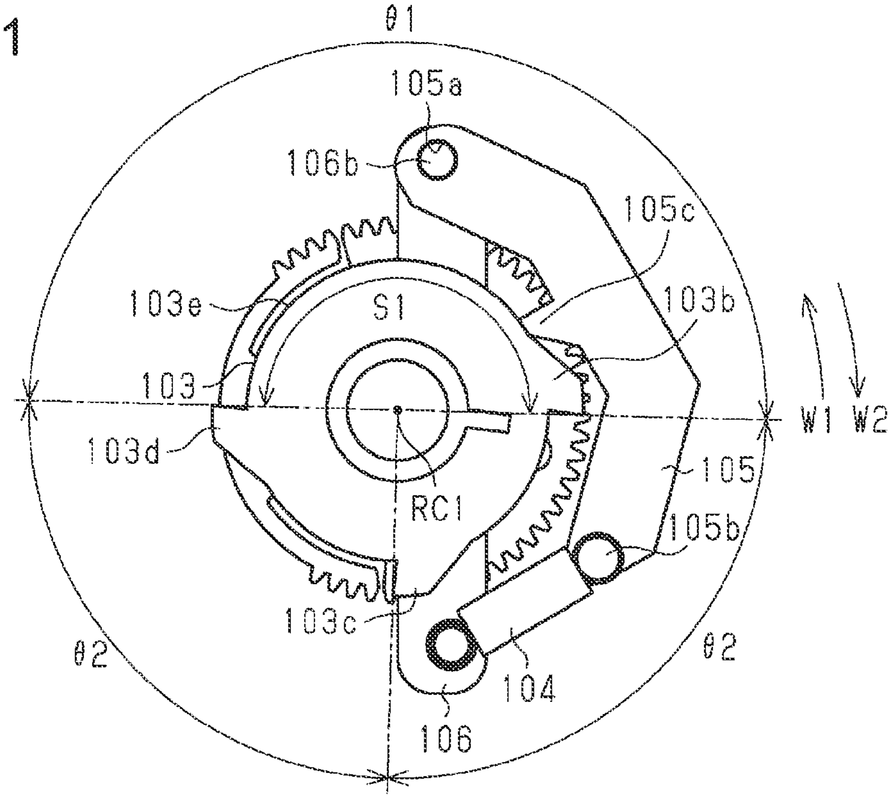
FIG. 11 is a front view illustrating a state in which an engagement portion is located within a first interval.

As illustrated in FIG. 11, when the engagement portion 105*c* is located within the first interval S1, the driving source 114 causes the first rotating body 106 to perform forward-and-reverse rotational operation by a rotation angle that is smaller than the first angle θ1 and is not smaller than the second angle θ2. When the first rotating body 106 rotates in the forward direction W1, even if the engagement portion 105*c* comes into engagement with the convex portion 103*d*, the engagement portion 105*c* pushes the convex portion 103*d*, and the first rotating body 106 causes the second rotating body 103 to rotate. Therefore, the engagement portion 105*c* remains located within the first interval S1 when the forward rotation ends.

Then, the first rotating body 106 in this state rotates in the reverse direction W2 by a rotation angle that is the same as the rotation angle of the forward rotation and is smaller than the first angle θ1. If the engagement portion 105*c* came into engagement with the convex portion 103*d* during the process of the forward rotation, even after the reverse rotation of the first rotating body 106 in this state by a rotation angle that is smaller than the first angle θ1, the engagement portion 105*c* remains located within the first interval S1. If the engagement portion 105*c* did not come into engagement with the convex portion 103*d* during the process of the forward rotation, the reverse rotation of the first rotating body 106 in this state by a rotation angle that is the same as the rotation angle of the forward rotation brings the first rotating body 106 back to a state before the execution of the forward-and-reverse rotational operation. This means that the engagement portion 105*c* remains located within the first interval S1.

That is, when the engagement portion 105*c* is located within the first interval S1, no matter how many times the driving source 114 causes the first rotating body 106 to perform forward-and-reverse rotational operation by a rotation angle that is smaller than the first angle θ1 and is not smaller than the second angle θ2, the engagement portion 105*c* will remain located within the first interval S1.

Figure 12:
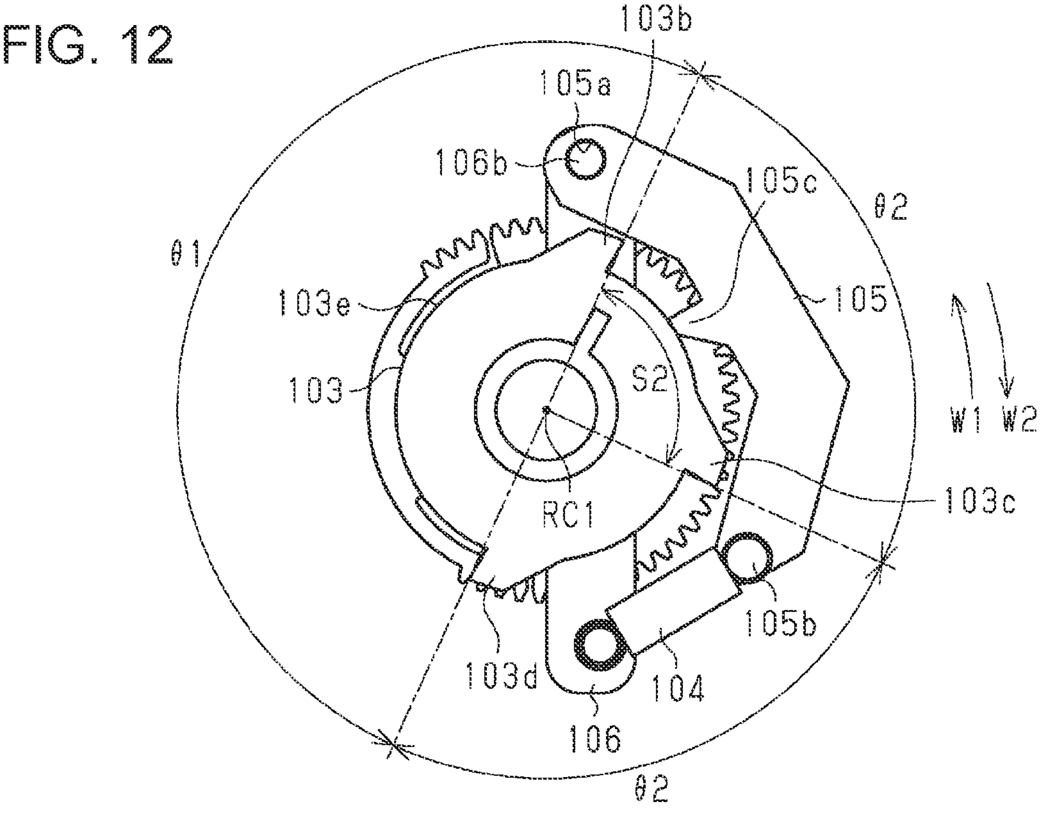
FIG. 12 is a front view illustrating a state in which the engagement portion is located within a second interval.

As illustrated in FIG. 12, when the engagement portion 105*c* is located within any of the other intervals, the driving source 114 causes the first rotating body 106 to perform forward-and-reverse rotational operation by a rotation angle that is smaller than the first angle θ1 and is not smaller than the second angle θ2. When the first rotating body 106 rotates in the forward direction W1, the engagement portion 105*c* comes into engagement with a convex portion, and the first rotating body 106 causes the second rotating body 103 to rotate due to the pushing of the convex portion by the engagement portion 105*c*. Therefore, the engagement portion 105*c* remains located within this other interval when the forward rotation ends. In the present embodiment, all of the other intervals are the second intervals S2.

Then, the first rotating body 106 in this state rotates in the reverse direction W2 by a rotation angle that is the same as the rotation angle of the forward rotation and is not smaller than the second angle θ2. As defined earlier, the second angle θ2 is the largest one of central angles formed with respect to the center of rotation RC1 by respective two convex portions each forming an interval smaller than the first interval S1. Therefore, the engagement portion 105*c* climbs over at least one convex portion during the process of the reverse rotation. That is, if forward-and-reverse rotational operation is performed once when the engagement portion 105*c* is located within the other interval, the engagement portion 105*c* moves into any interval located on the reverse-directional W2 side. Since the rotation angle is smaller than the first angle θ1, if the adjacent interval located on the reverse-directional W2 side is the first interval S1, the engagement portion 105*c* moves into the first interval S1.

If this interval into which the engagement portion 105*c* moves is the first interval S1, no matter how many times the driving source 114 causes the first rotating body 106 to perform forward-and-reverse rotational operation by a rotation angle that is smaller than the first angle θ1 and is not smaller than the second angle θ2 after the moving, the engagement portion 105*c* will remain located within the first interval S1.

If this interval into which the engagement portion 105*c* moves is an interval other than the first interval S1, when, after the moving, the driving source 114 causes the first rotating body 106 to perform forward-and-reverse rotational operation by a rotation angle that is smaller than the first angle θ1 and is not smaller than the second angle θ2, the engagement portion 105*c* will further move into any interval located on the reverse-directional W2 side.

That is, the driving source 114 causes the first rotating body 106 to perform forward-and-reverse rotational operation repeatedly by a rotation angle that is smaller than the first angle θ1 and is not smaller than the second angle θ2. The number of times of repetition is greater than or equal to a number obtained by subtracting one from the number of the convex portions provided on the outer circumference 103*e*. That is, it is possible to position the engagement portion 105*c* into the first interval S1 by driving the first rotating body 106 by the driving source 114 to repeat forward-and-reverse rotational operation by this number of times of repetition. The number of times of repetition may be defined as the number of times of performing the first operation, which is an example of forward-and-reverse rotational operation involving forward rotation performed once and reverse rotation performed once.

In the first operation, the rotation angle of forward rotation in forward-and-reverse rotational operation and the rotation angle of reverse rotation in the forward-and-reverse rotational operation do not necessarily have to be the same rotation angle. However, the rotation angle of forward rotation is set be not smaller than the rotation angle of reverse rotation so as to ensure that, in the first operation performed under a condition that the engagement portion 105*c* is located within the first interval S1, the engagement portion 105*c* will not climb over the convex portion 103*b* during the process of the reverse rotation. For example, even in a case where, in the first operation, the rotation angle of forward rotation is the average of the first angle θ1 and the second angle θ2 and where the rotation angle of reverse rotation is the second angle θ2, it is possible to position the engagement portion 105*c* into the first interval S1. The rotation angle may be varied each time forward-and-reverse rotational operation is performed once in repetitive execution. However, for simple control of forward-and-reverse rotational operation, it will be preferable if, also in the first operation, the rotation angle of forward rotation in forward-and-reverse rotational operation and the rotation angle of reverse rotation in the forward-and-reverse rotational operation are the same rotation angle, as in the present embodiment.

If the engagement portion 105*c* is located within the first interval S1 and at a position of not being in engagement with the convex portion 103*d* at the time of forward rotation performed first, the execution of the first operation does not cause the movement of the second rotating body 103 at all. That is, though the engagement portion 105*c* is located within the first interval S1, the rotational position of the second rotating body 103 has not been determined yet, and the rotational position of the rotary valve 102 remains unknown. The second operation is performed for the purpose of positioning the second rotating body 103 to a predetermined rotational position also under this condition.

Next, the second operation for positioning the second rotating body 103 to a predetermined rotational position, starting from a state in which the engagement portion 105*c* is located within the first interval S1, will now be explained.

As illustrated in FIG. 11, with the engagement portion 105*c* located within the first interval S1, the driving source 114 causes the first rotating body 106 to perform forward-and-reverse rotational operation by a rotation angle that is not smaller than the first angle θ1. Since the rotation angle is not smaller than the first angle θ1, when the first rotating body 106 rotates in the forward direction W1, the engagement portion 105*c* comes into engagement with the convex portion 103*d*, and the engagement portion 105*c* pushes the convex portion 103*d*. Therefore, the first rotating body 106 causes the second rotating body 103 to rotate to a predetermined rotational position.

Then, the first rotating body 106 in this state rotates in the reverse direction W2 by a predetermined rotation angle that is the same as the rotation angle of the forward rotation and is not smaller than the first angle θ1. When the first rotating body 106 rotates in the reverse direction W2 by the rotation angle that is not smaller than the first angle θ1 staring from a state in which the engagement portion 105*c* is in engagement with the convex portion 103*d*, the engagement portion 105*c* climbs over at least one convex portion. Therefore, the engagement portion 105*c* moves into any interval located on the reverse-directional W2 side. Within a range of not being smaller than the first angle θ1, the rotation angle is set such that the engagement portion 105*c* will move into a predetermined interval during the process of the reverse rotation in the second operation and such that the engagement portion 105*c* will be in engagement with a predetermined convex portion when the reverse rotation in the second operation ends.

It is possible to rotate the rotary valve 102 together with the second rotating body 103 to a predetermined rotational position by the forward rotation in the second operation. It is possible to bring the engagement portion 105*c* into engagement with a predetermined convex portion by the reverse rotation in the second operation. With this state taken as the origin of the rotary valve 102, the switching operation described earlier is performed, thereby switching the flow passage that is in communication with the first flow passage 101*b*. A specific example will now be explained.

When the rotation angle in the second operation is the first angle θ1, the switching mechanism 120 switches the rotational position of the second rotating body 103 such that the convex portion 103*d* will be located at the position of the third flow passage 101*d* illustrated in FIG. 4 and that the engagement portion 105*c* will come into engagement with the convex portion 103*b*. That is, when the rotation angle in the second operation is the first angle θ1, the switching mechanism 120 switches the rotational position of the second rotating body 103 into a rotational position where the first flow passage 101*b* illustrated in FIG. 4 is in communication with neither of the flow passages. Then, with this state taken as the origin of the rotary valve 102, the switching operation described earlier is performed, thereby switching the flow passage that is in communication with the first flow passage 101*b*.

The rotation angle in the second operation may be "the first angle θ1+the second angle θ2". In this case, the switching mechanism 120 switches the rotational position of the second rotating body 103 such that the convex portion 103*d* will be located at the symmetrical position from the position of the first flow passage 101*b* illustrated in FIG. 4 with respect to the center of rotation RC1 and that the engagement portion 105*c* will come into engagement with the convex portion 103*c*. That is, when the rotation angle in the second operation is "the first angle θ1+the second angle θ2", the switching mechanism 120 switches the rotational position of the second rotating body 103 into a rotational position where the first flow passage 101*b* illustrated in FIG. 4 is in communication with the second flow passage 101*c*. Then, with this state taken as the origin of the rotary valve 102, the switching operation described earlier is performed, thereby switching the flow passage that is in communication with the first flow passage 101*b*.

The rotation angle in the second operation may be "the first angle θ1+the second angle θ2+the second angle θ2". In this case, the switching mechanism 120 switches the rotational position of the second rotating body 103 such that the convex portion 103*d* will be located at the position of the second flow passage 101*c* illustrated in FIG. 4 and that the engagement portion 105*c* will come into engagement with the convex portion 103*d*. That is, when the rotation angle in the second operation is "the first angle θ1+the second angle θ2+the second angle θ2", the switching mechanism 120 switches the rotational position of the second rotating body 103 into a rotational position where the first flow passage 101*b* illustrated in FIG. 4 is in communication with the third flow passage 101*d*. Then, with this state taken as the origin of the rotary valve 102, the switching operation described earlier is performed, thereby switching the flow passage that is in communication with the first flow passage 101*b*.

As described above, with the engagement portion 105*c* located within the first interval S1, the driving source 114 causes the first rotating body 106 to perform forward-and-reverse rotational operation by a predetermined rotation angle that is not smaller than the first angle θ1, thereby switching the rotational position of the second rotating body 103 into a predetermined rotational position. That is, even if the rotational position of the rotary valve 102 becomes unknown, it is possible to switch the rotational position of the second rotating body 103 into a predetermined rotational position by causing, by the driving source 114, the first rotating body 106 to perform the first operation and the second operation sequentially. By this means, it is possible to switch the flow passage that is in communication with the first flow passage 101*b* into a predetermined flow passage.

In the second operation, the rotation angle of forward rotation in forward-and-reverse rotational operation and the rotation angle of reverse rotation in the forward-and-reverse rotational operation do not necessarily have to be the same rotation angle. An explanation for the second operation is omitted because it is the same as the foregoing explanation for the switching operation. For simple control of forward-and-reverse rotational operation, it will be preferable if, also in the second operation, the rotation angle of forward rotation in forward-and-reverse rotational operation and the rotation angle of reverse rotation in the forward-and-reverse rotational operation are the same rotation angle, as in the present embodiment.

Configuration of Suction Device

Figure 13:
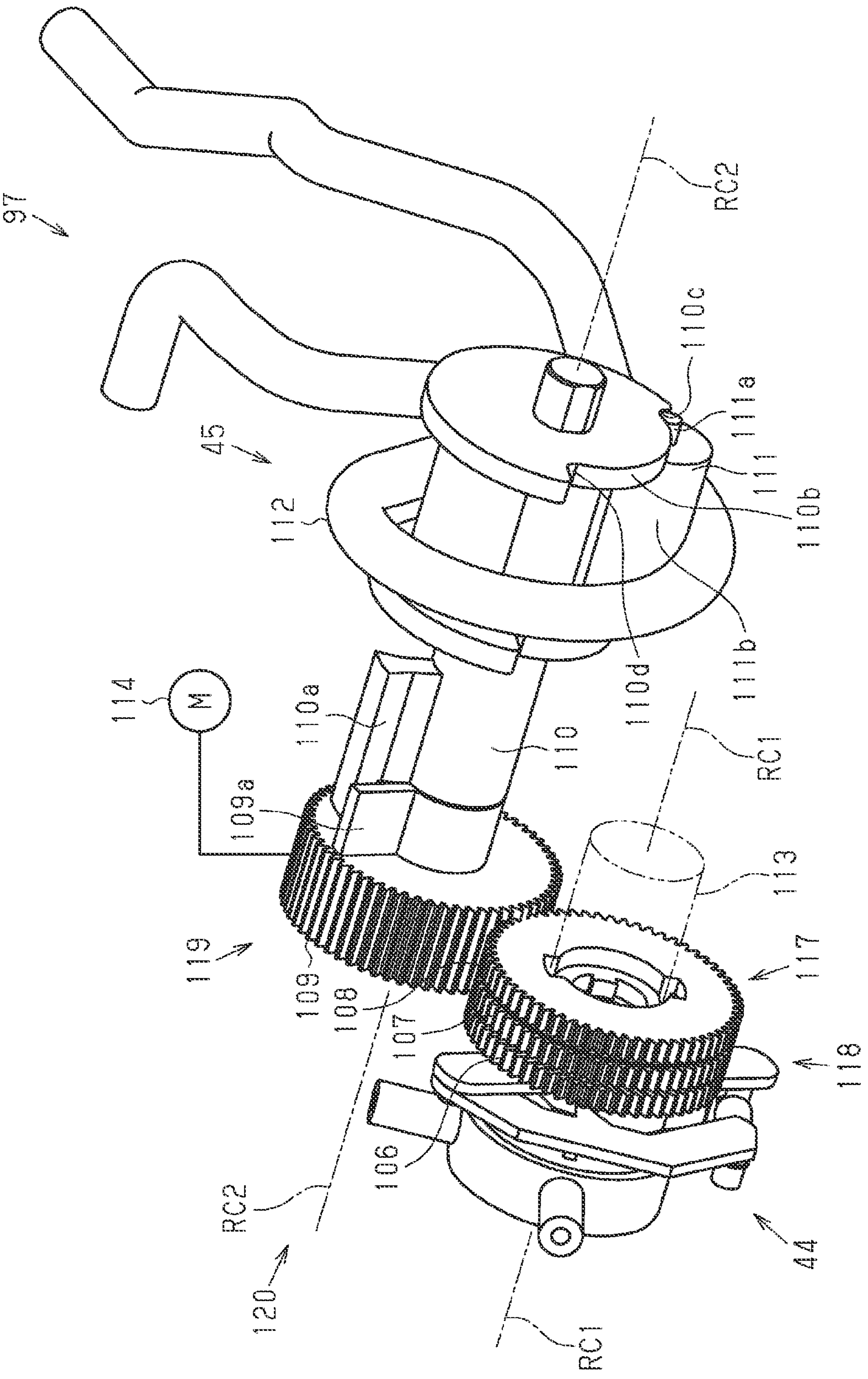
FIG. 13 is a perspective view illustrating the structure of a suction device.

As illustrated in FIG. 13, the suction device 97 includes the flow passage switching mechanism 44. The flow passage switching mechanism 44 includes the switching mechanism 120. The switching mechanism 120 includes a driving portion 119. The driving portion 119 drives the switching mechanism 120. The driving portion 119 includes a driving gear 109 as an example of a driving rotating body. The driving gear 109 is able to rotate by receiving a driving force transmitted from the driving source 114. Having this configuration, the driving gear 109 drives the first rotating body 106. The first rotating body 106 receives the driving force transmitted from the driving source 114 via the driving gear 109. The driving source 114 is a device that is able to perform forward rotation and reverse rotation with its rotation angle controlled, for example, a stepper motor, or a DC motor equipped with an encoder. If the driving source is a linear-type driving source which performs reciprocating linear motion and the movement distance of the linear motion of which is controlled, and further if the rotation angle is controlled by transforming the linear motion into rotary motion, such a driving source is considered herein to be synonymous with a driving source the rotation angle of which is controlled.

The pump 45 includes a pump driving shaft 110, a roller 111, and a tube 112. The pump driving shaft 110 is driven by the driving gear 109. Liquid flows through the tube 112. The roller 111 has a shaft 111*a* and an outer circumferential surface 111*b*. The shaft 111*a* is supported on the bearing portion 110*b* of the pump driving shaft 110. The outer circumferential surface 111*b* presses the tube 112. The driving gear 109 and the pump driving shaft 110 are able to rotate around the center of rotation RC2. The driving gear 109 drives the pump 45 by receiving the driving force transmitted from the driving source 114. That is, the pump 45 receives the driving force transmitted from the driving source 114 via the driving gear 109. The driving gear 109 has a second engagement portion 109*a*. The pump driving shaft 110 of the pump 45 has a to-be-engaged portion 110*a*, which is able to become engaged with the second engagement portion 109*a* in the direction of rotation. With the second engagement portion 109*a* engaged with the to-be-engaged portion 110*a*, the driving gear 109 rotates in a direction in which the second engagement portion 109*a* pushes the to-be-engaged portion 110*a*. The pump 45 is driven as a result of this operation. Suction operation performed by driving the pump 45 will be described later.

The switching mechanism 120 includes a delayed transmission mechanism 118. The delayed transmission mechanism 118 includes the driving gear 109, a first gear 108, a second gear 107, the first rotating body 106, and a second urging member 113. The delayed transmission mechanism 118 delays the timing at which the first rotating body 106 starts to rotate. The second urging member 113 urges the first gear 108 against the second gear 107. The first gear 108 and the second gear 107 are configured such that a large force of friction will act between the surface of the first gear 108 pushing the second gear 107 and the surface of the second gear 107 pushed by the first gear 108. That is, the first gear 108 and the second gear 107 constitute a friction clutch 117. The operation of the delayed transmission mechanism 118 will be described later.

Delayed Transmission Mechanism

First, each gear will now be explained.

Figure 14:
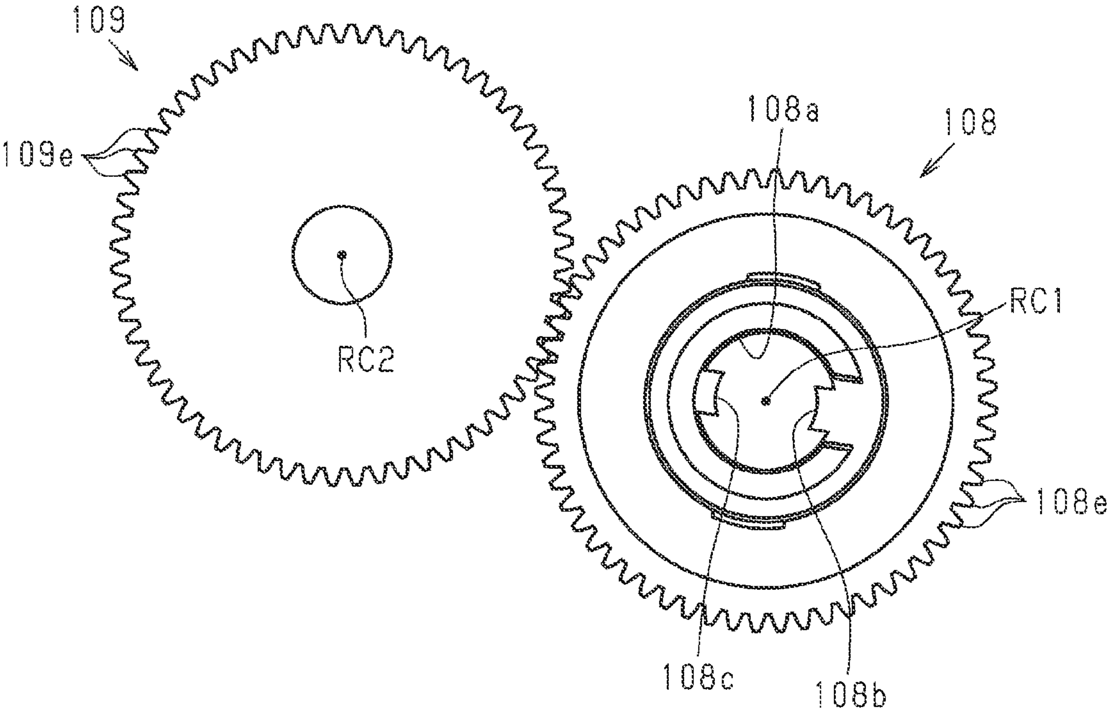
FIG. 14 is a front view of a driving gear and a first gear.

As illustrated in FIG. 14, the first gear 108 is able to rotate around the center of rotation RC1. The teeth 109*e* of the driving gear 109 mesh with the teeth 108*e* of the first gear 108. This meshing transmits the rotation of the driving gear 109 to the first gear 108. A non-illustrated rotating shaft is fitted inside on an inner circumferential surface 108*a*. The rotating shaft is fixed to the first gear 108 by junctions 108*b* and 108*c* in such a way as to be unable to rotate.

Figure 15:
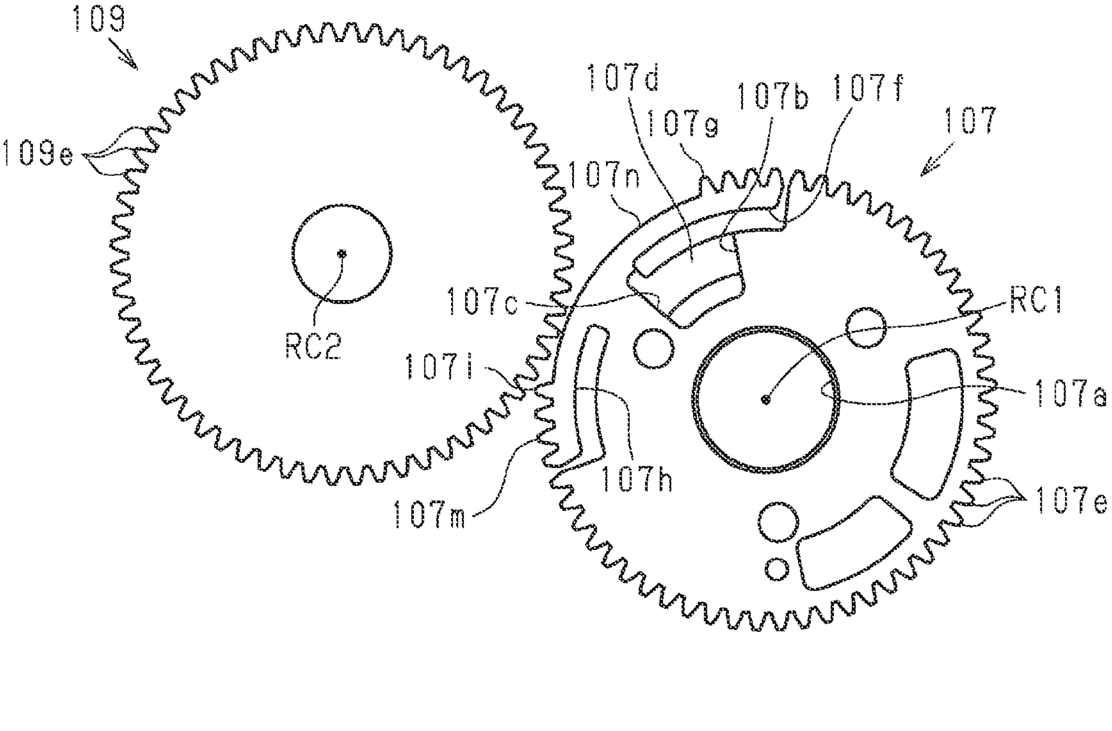
FIG. 15 is a front view of the driving gear and a second gear.

As illustrated in FIG. 15, the inner circumferential surface 107*a* of the second gear 107 is rotatably fitted on the non-illustrated rotating shaft fixed to the first gear 108; therefore, the second gear 107 is able to rotate around the center of rotation RC1 in relation to the first gear 108.

The second gear 107 has a groove portion 107*d* having a recessed shape in its surface in contact with the first rotating body 106. The groove portion 107*d* has a to-be-caught portion 107*b* and a to-be-caught portion 107*c* for getting caught onto the first rotating body 106. The second gear 107 further has a tooth row portion 107*m* having an array of teeth 107*e* on its outer circumference and a toothless portion 107*n* not having an array of teeth 107*e* on its outer circumference. Cutouts 107*f* and 107*h* are formed at respective two end regions of the tooth row portion 107*m*. Four teeth 107*e* including an end tooth 107*g* are arranged on the outer circumference of the cutout 107*f* Four teeth 107*e* including an end tooth 107*i* are arranged on the outer circumference of the cutout 107*h*.

The meshing of the teeth 109*e* of the driving gear 109 with the teeth 107*e* of the second gear 107 transmits the rotation of the driving gear 109 to the second gear 107. However, the rotation of the driving gear 109 is not always transmitted to the second gear 107, depending on the rotational position of the second gear 107, because the second gear 107 has the toothless portion 107*n*.

Even when the rotation of the driving gear 109 is not transmitted to the second gear 107, the second gear 107 rotates by accompanying the rotation of the first gear 108 via the friction clutch 117 when the rotation torque of the second gear 107 is smaller than the transmission torque of the friction clutch 117 illustrated in FIG. 13. When the rotation torque of the second gear 107 is larger than the transmission torque of the friction clutch 117, the second gear 107 does not rotate because the friction clutch 117 slips, though the first gear 108 rotates. In other words, when the rotation of the driving gear 109 is not transmitted to the second gear 107, the second gear 107 does not rotate if a load torque acts on the second gear 107, though the first gear 108 rotates.

Figure 16:
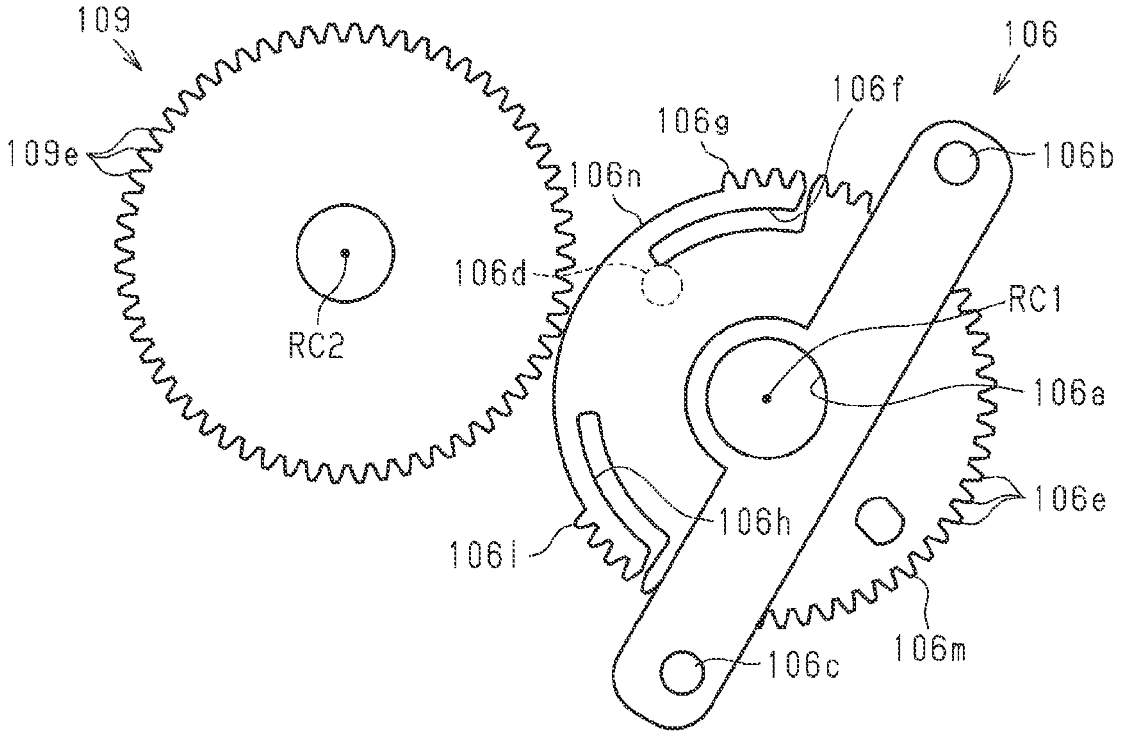
FIG. 16 is a front view of the driving gear and the first rotating body.

As illustrated in FIG. 16, the inner circumferential surface 106*a* of the first rotating body 106 is rotatably fitted on the non-illustrated rotating shaft fixed to the first gear 108; therefore, the first rotating body 106 is able to rotate around the center of rotation RC1 in relation to the first gear 108.

The first rotating body 106 has a pin portion 106*d* having a convex shape on its surface in contact with the second gear 107. The to-be-caught portion 107*b*, 107*c* of the second gear 107 gets caught on the pin portion 106*d*. The first rotating body 106 further has a tooth row portion 106*m* having an array of teeth 106*e* on its outer circumference and a toothless portion 106*n* not having an array of teeth 106*e* on its outer circumference. Cutouts 106*f* and 106*h* are formed at respective two end regions of the tooth row portion 107*m*. Four teeth 106*e* including an end tooth 106*g* are arranged on the outer circumference of the cutout 106*f* Four teeth 106*e* including an end tooth 106*i* are arranged on the outer circumference of the cutout 106*h*.

The meshing of the teeth 109*e* of the driving gear 109 with the teeth 106*e* of the first rotating body 106 transmits the rotation of the driving gear 109 to the first rotating body 106. However, the rotation of the driving gear 109 is not always transmitted to the first rotating body 106, depending on the rotational position of the first rotating body 106, because the first rotating body 106 has the toothless portion 106*n*. The percentage of the part occupied by the toothless portion 106*n* relative to the entire outer circumference of the first rotating body 106 is higher than the percentage of the part occupied by the toothless portion 107*n* relative to the entire outer circumference of the second gear 107.

When the second gear 107 rotates, the to-be-caught portion 107*b*, 107*c* of the second gear 107 gets caught on the pin portion 106*d* of the first rotating body 106, resulting in that the first rotating body 106 rotates by being towed by the second gear 107.

Next, a relationship between the first rotating body 106 and the second gear 107 will now be explained.

Figure 17:
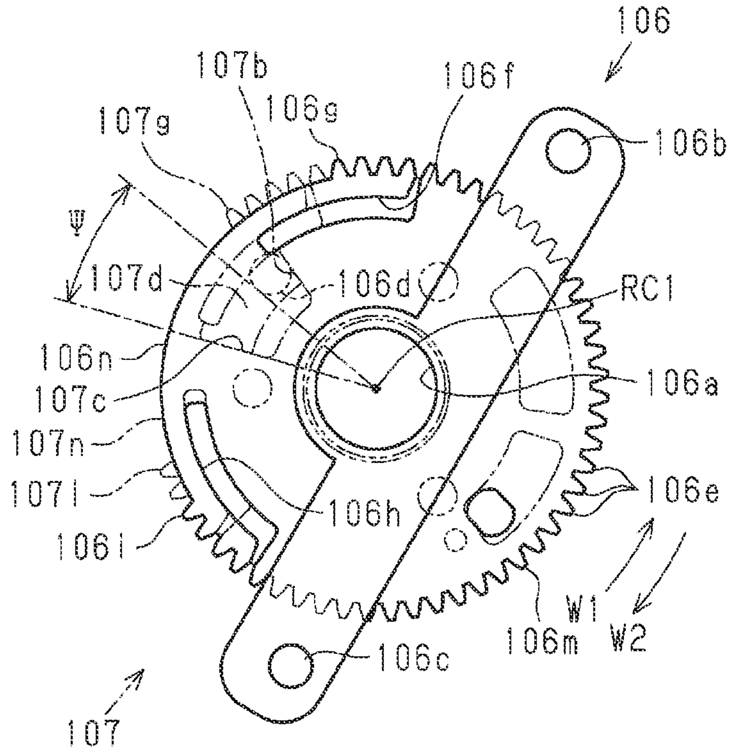
FIG. 17 is a front view illustrating a state in which the second gear is hooked to the first rotating body.

As illustrated in FIG. 17, when the second gear 107 rotates in the forward direction W1, the to-be-caught portion 107*b* gets caught on the pin portion 106*d*. Therefore, the second gear 107 gets caught onto the first rotating body 106. When the second gear 107 further rotates in the forward direction W1, the first rotating body 106 rotates in the forward direction W1 together with the second gear 107 while being towed by the second gear 107.

When the second gear 107 located at the position illustrated in FIG. 17 rotates in the reverse direction W2, the to-be-caught portion 107*b* is released away from the pin portion 106*d*. Therefore, the second gear 107 alone rotates in the reverse direction W2. When the second gear 107 rotates in the reverse direction W2 to the position illustrated in FIG. 18 by a rotation angle that is equal to a pivotal movement angle illustrated in FIG. 17, the to-be-caught portion 107*c* gets caught on the pin portion 106*d*.

Figure 18:
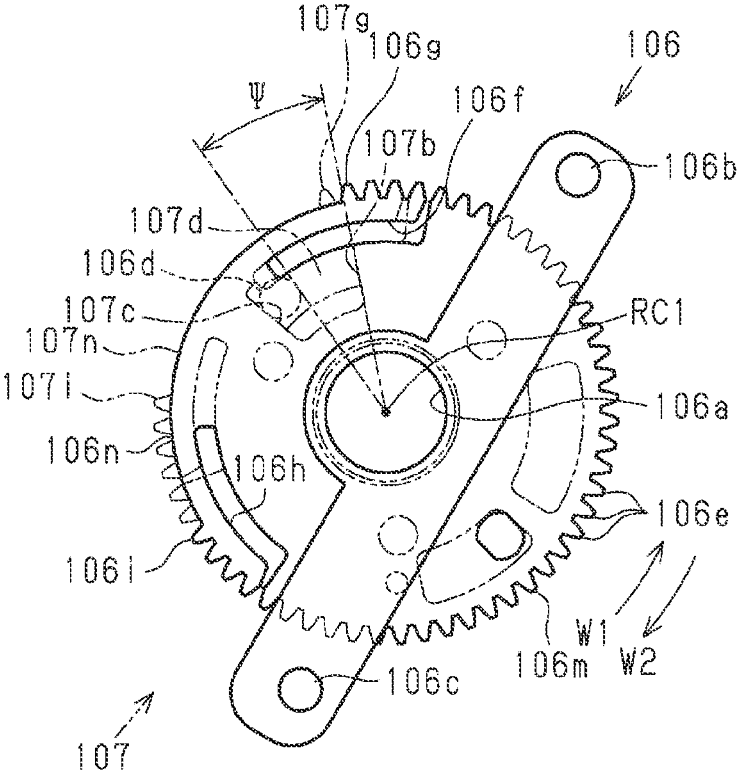
FIG. 18 is a front view illustrating a state in which the second gear is hooked to the first rotating body.

Since the to-be-caught portion 107*c* gets caught on the pin portion 106*d*, the second gear 107 gets caught onto the first rotating body 106 when the second gear 107 rotates in the reverse direction W2 as illustrated in FIG. 18. When the second gear 107 further rotates in the reverse direction W2, the first rotating body 106 rotates in the reverse direction W2 together with the second gear 107 while being towed by the second gear 107.

When the second gear 107 located at the position illustrated in FIG. 18 rotates in the forward direction W1, the to-be-caught portion 107*c* is released away from the pin portion 106*d*. Therefore, the second gear 107 alone rotates in the forward direction W1. When the second gear 107 rotates in the forward direction W1 to the position illustrated in FIG. 17 by a rotation angle that is equal to a pivotal movement angle illustrated in FIG. 18, the to-be-caught portion 107*b* gets caught on the pin portion 106*d*.

The toothless portion 106*n* and the toothless portion 107*n* are arranged such that, both in a state illustrated in FIG. 17 and in a state illustrated in FIG. 18, the end tooth 107*g* is located relatively on the forward-directional W1 side in comparison with the end tooth 106*g*, and the end tooth 107*i* is located relatively on the reverse-directional W2 side in comparison with the end tooth 106*i*.

Next, the operation of the delayed transmission mechanism 118 will now be explained.

Figure 19:
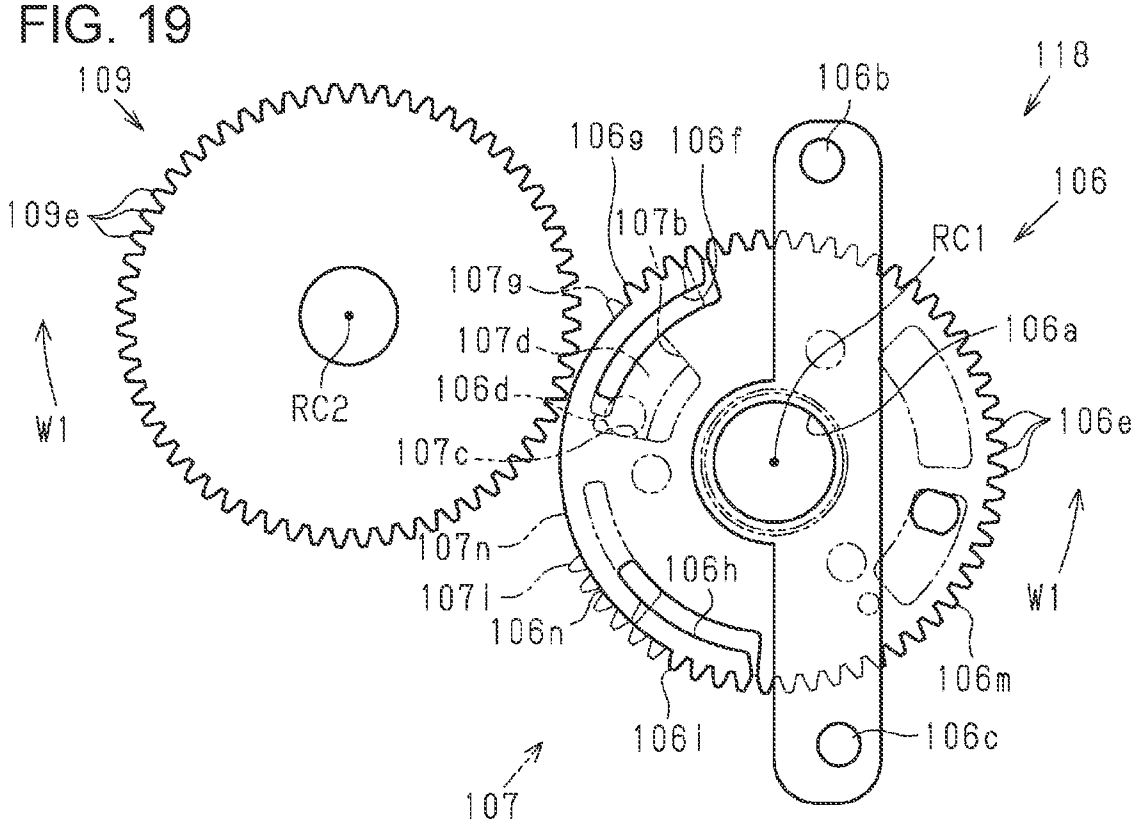
FIG. 19 is a front view illustrating the structure of a delayed transmission mechanism.

As illustrated in FIG. 19, when the driving gear 109 rotates in the forward direction W1, the first gear 108 illustrated in FIG. 13 rotates in the forward direction W1. At this time, the first rotating body 106 and the second gear 107 are in a state illustrated in FIG. 18, and the forward direction W1 in which the first gear 108 rotates is a direction that causes the to-be-caught portion 107*c* to go away from the pin portion 106*d*. Therefore, though the driving gear 109 is not in meshing engagement with the second gear 107 at this time, the second gear 107 rotates in the forward direction W1 together with the first gear 108 due to the transmission of the rotation of the first gear 108 to the second gear 107 via the friction clutch 117 illustrated in FIG. 13.

Figure 20:
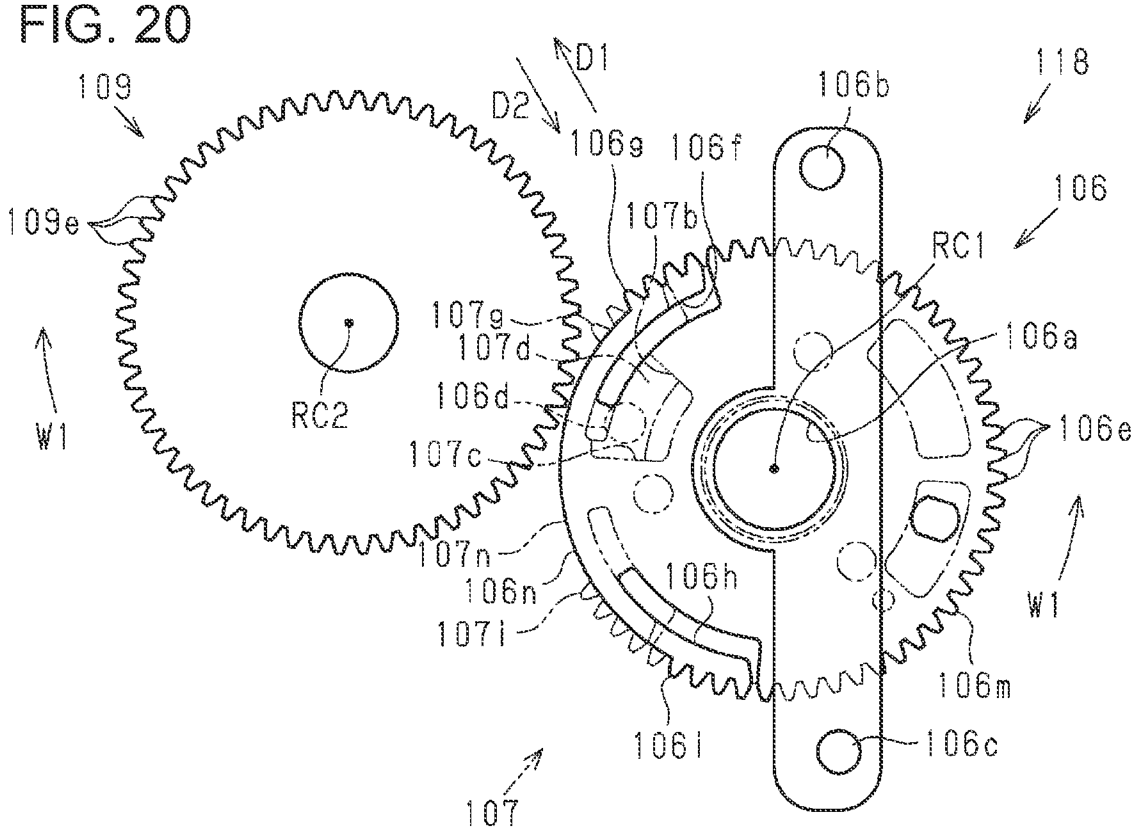
FIG. 20 is a front view illustrating a state in which the first gear and the second gear rotate.

As illustrated in FIG. 20, when the second gear 107 rotates in the forward direction W1 due to the above reason caused by the rotation of the driving gear 109 in the forward direction W1, the to-be-caught portion 107*c* is released away from the pin portion 106*d*. Then, the end tooth 107*g* comes into contact with a tooth 109*e* of the driving gear 109. When the end tooth 107*g* comes into contact with the tooth 109*e*, teeth 107*e* including the end tooth 107*g* give way in the direction D2 coming closer to the center of rotation RC1 flexibly due to the presence of the cutout 107*f*. Then, the end tooth 107*g* meshes with the tooth 109*e*. That is, the delayed transmission mechanism 118 changes from a state in which the rotation of the driving gear 109 is transmitted indirectly to the second gear 107 via the first gear 108 and the friction clutch 117 to a state in which the rotation of the driving gear 109 is transmitted directly to the second gear 107. Since the first rotating body 106 does not rotate at this time, the end tooth 106*g* does not come closer to the driving gear 109. That is, the end tooth 107*g* of the second gear 107 goes away from the end tooth 106*g* of the first rotating body 106.

Figure 21:
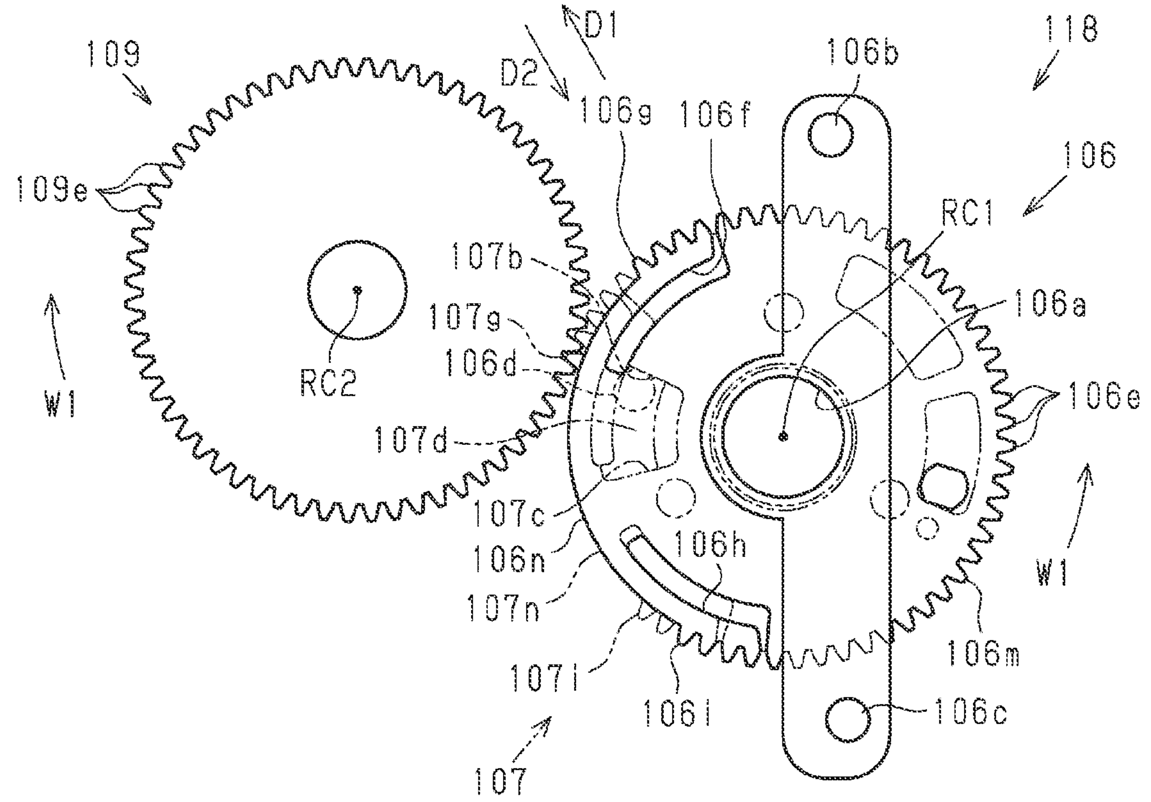
FIG. 21 is a front view illustrating a state in which the second gear meshes with the driving gear.

As illustrated in FIG. 21, when the second gear 107 further rotates in the forward direction W1 due to further rotation of the driving gear 109 in the forward direction W1, the to-be-caught portion 107*b* gets caught on the pin portion 106*d*. More specifically, when the second gear 107 illustrated in FIG. 19 rotates in the forward direction W1 by a rotation angle that is equal to the pivotal movement angle illustrated in FIG. 17, the to-be-caught portion 107*b* gets caught on the pin portion 106*d*. At this time, the first rotating body 106 and the second gear 107 are in a state illustrated in FIG. 17. Therefore, the first rotating body 106 rotates in the forward direction W1 together with the second gear 107 while being towed by the second gear 107, and the end tooth 106*g* illustrated in FIG. 16 comes closer to the driving gear 109. Then, the end tooth 106*g* comes into contact with a tooth 109*e* of the driving gear 109. When the end tooth 106*g* comes into contact with the tooth 109*e*, teeth 106*e* including the end tooth 106*g* give way in the direction D2 coming closer to the center of rotation RC1 flexibly due to the presence of the cutout 106*f*. Then, the end tooth 106*g* meshes with the tooth 109*e*. That is, the rotation of the driving gear 109 becomes directly transmittable to the first rotating body 106.

Figure 22:
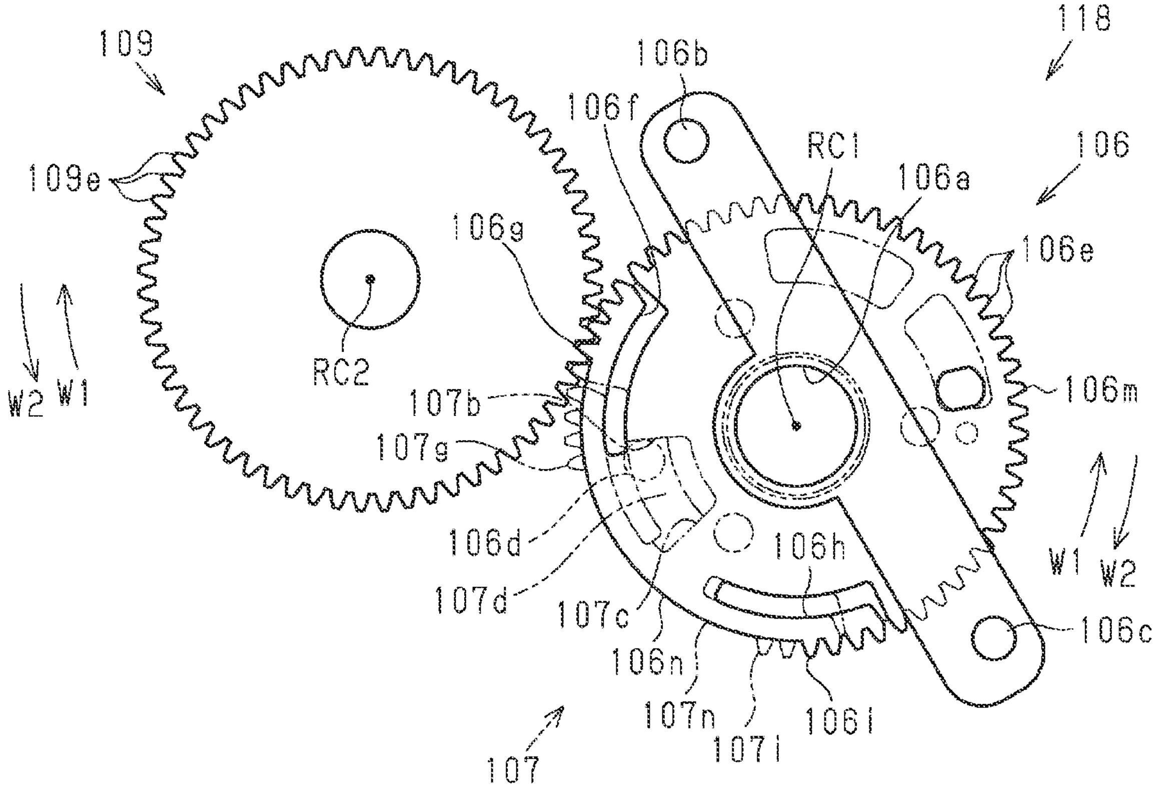
FIG. 22 is a front view illustrating a state in which the first rotating body meshes with the driving gear.

As illustrated in FIG. 22, when the second gear 107 further rotates in the forward direction W1 due to further rotation of the driving gear 109 in the forward direction W1, the first rotating body 106 rotates in the forward direction W1. The rotation of the second gear 107 is transmitted to the first rotating body 106 with a delay corresponding to a rotation angle that is equal to the pivotal movement angle $\psi$. Therefore, when the delayed transmission mechanism 118 operates, the rotation angle of the first rotating body 106 is smaller than the rotation angle of the second gear 107 by a difference corresponding to the rotation angle that is equal to the pivotal movement angle $\psi$.

In a range where the teeth 106*e* of the tooth row portion 106*m* illustrated in FIG. 16 mesh with the teeth 109*e* of the driving gear 109, it is possible to cause the first rotating body

106 to rotate in the forward direction W1 in a state in which the rotation of the driving gear 109 is transmitted directly to the first rotating body 106.

As illustrated in FIG. 22, in the delayed transmission mechanism 118, when the driving gear 109 rotates in the reverse direction W2 in a state in which the teeth 109 mesh with the teeth 106*e*, the first rotating body 106, the second gear 107, and the first gear 108 rotate in the reverse direction W2. When the driving gear 109 rotates in the reverse direction W2 to an angular extent that the end tooth 106*g* does not mesh with any tooth 109*e*, the first rotating body 106 stops rotating, whereas the second gear 107 and the first gear 108 rotate in the reverse direction W2. Therefore, the to-be-caught portion 107*b* is released away from the pin portion 106*d*.

Figure 23:
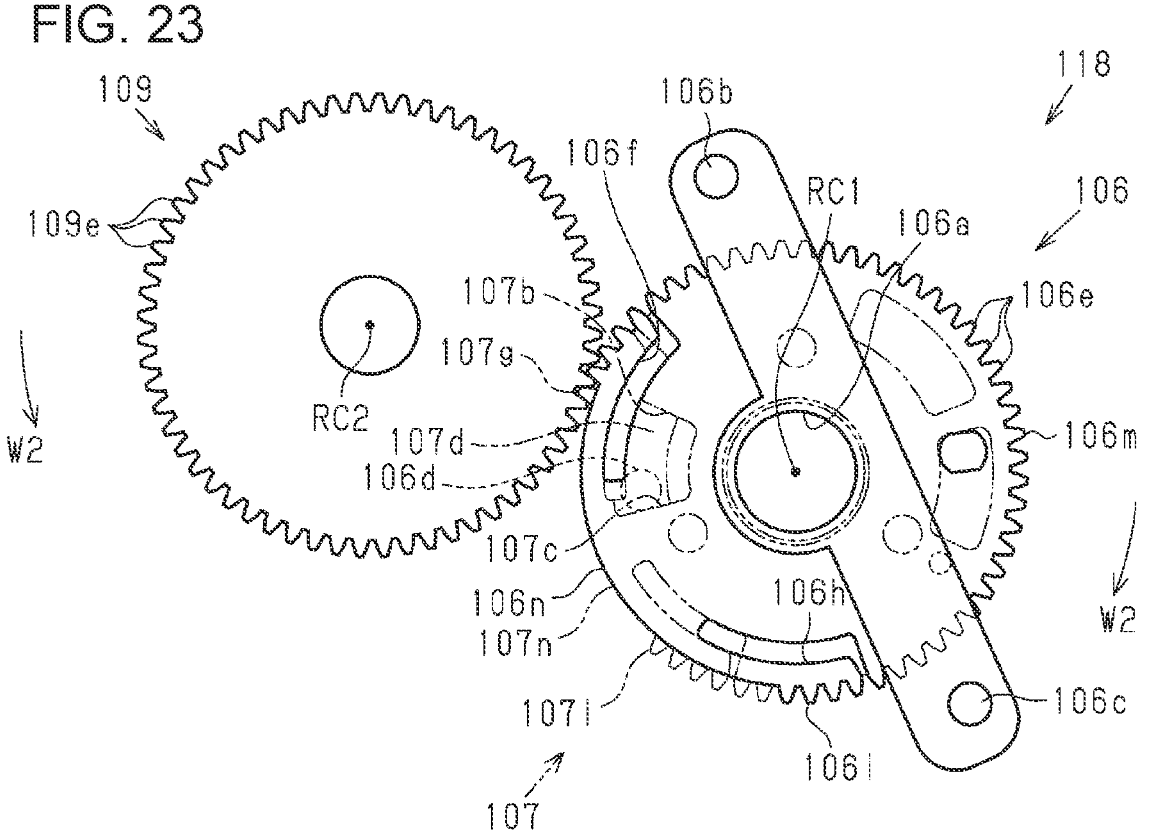
FIG. 23 is a front view illustrating a state in which the first rotating body becomes disengaged from the driving gear.

As illustrated in FIG. 23, when the second gear 107 further rotates in the reverse direction W2 due to further rotation of the driving gear 109 in the reverse direction W2, the to-be-caught portion 107*c* gets caught on the pin portion 106*d*. Then, the first rotating body 106 rotates in the reverse direction W2 together with the second gear 107 while being towed by the second gear 107.

Figure 24:
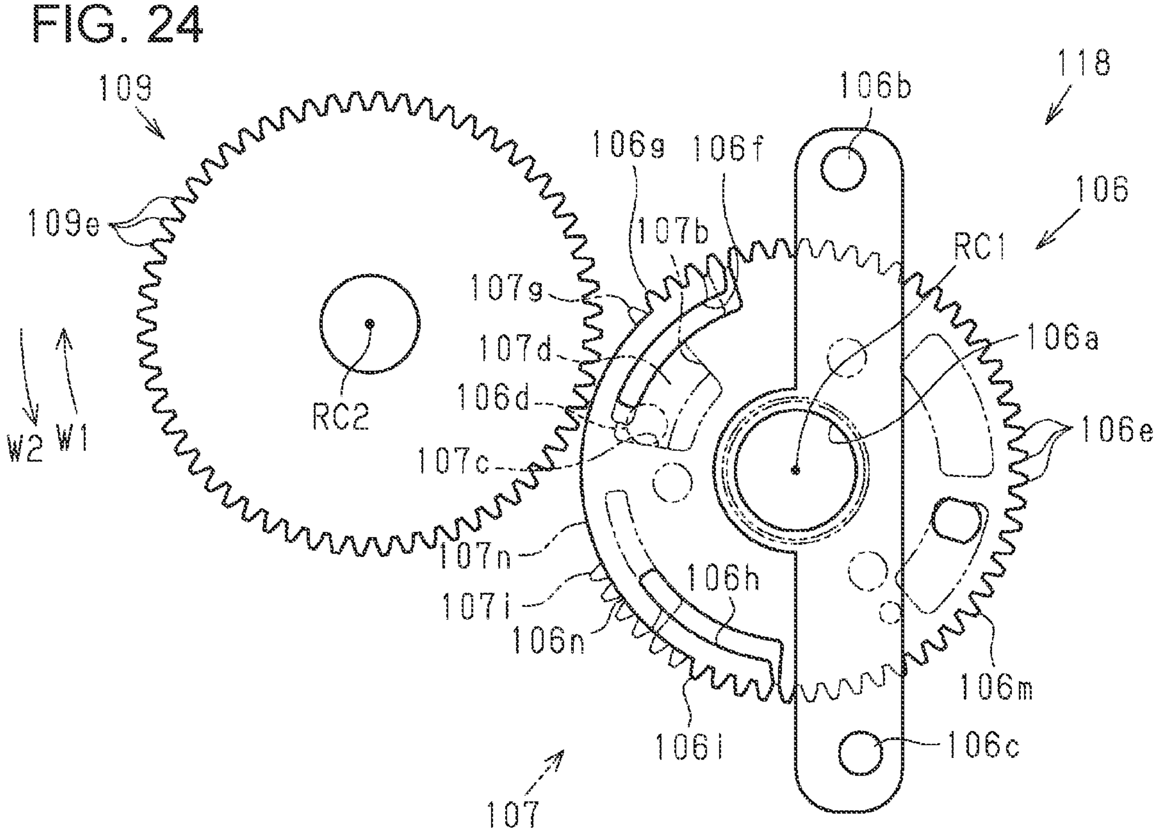
FIG. 24 is a front view illustrating a state in which the driving gear after disengagement from the second gear rotates.

As illustrated in FIG. 24, when the driving gear 109 rotates in the reverse direction W2 to an angular extent that the end tooth 107*g* does not mesh with any tooth 109*e*, the rotation of the driving gear 109 becomes not directly transmittable to the second gear 107. Since the second gear 107 is towing the first rotating body 106, a load torque for rotating the first rotating body 106 acts on the second gear 107. The transmission torque of the friction clutch 117 is set to be smaller than the load torque for rotating the first rotating body 106. Therefore, the friction clutch 117 slips, and the rotation of the first gear 108 is not transmitted to the second gear 107 via the friction clutch 117 because of the slipping. That is, the delayed transmission mechanism 118 causes the driving gear 109 alone to rotate in the reverse direction W2 while keeping the first rotating body 106 at the rotational position illustrated in FIG. 24. In other words, it is possible to cause the driving gear 109 alone to rotate in the reverse direction W2 while retaining the rotational position of the first rotating body 106 at the time of meshing disengagement when the end tooth 106*g* becomes disengaged from the tooth 109*e* due to the rotation of the first rotating body 106 in the reverse direction W2.

When the driving gear 109 is rotated in the forward direction W1 in this state, the rotation of the driving gear 109 is transmitted to the second gear 107 via the first gear 108 and the friction clutch 117. Then, the rotation of the driving gear 109 becomes directly transmittable to the second gear 107 due to the meshing of the driving gear 109 with the second gear 107. Then, the second gear 107 that is in meshing engagement with the driving gear 109 tows the first rotating body 106 to cause the first rotating body 106 to rotate in the forward direction W1 in a state in which the rotation of the first rotating body 106 is delayed by an amount corresponding to a rotation angle that is equal to the pivotal movement angle ψ. Then, the rotation of the driving gear 109 becomes directly transmittable to the first rotating body 106 due to the meshing of the driving gear 109 with the first rotating body 106. That is, by causing the driving gear 109 to rotate in the forward direction W1 after causing the driving gear 109 alone to rotate in the reverse direction W2 from the position where the end tooth 106*g* becomes disengaged from the tooth 109*e*, it is possible to cause the first rotating body 106 to rotate in the forward direction W1 by a predetermined rotation angle.

Similarly, it is possible to cause the driving gear 109 alone to rotate in the forward direction W1 while retaining the rotational position of the first rotating body 106 at the time of meshing disengagement when the end tooth 106*i* becomes disengaged from the tooth 109*e* due to the rotation of the first rotating body 106 in the forward direction W1. Moreover, by causing the driving gear 109 to rotate in the reverse direction W2 after causing the driving gear 109 alone to rotate in the forward direction W1 from the position where the end tooth 106*i* becomes disengaged from the tooth 109*e*, it is possible to cause the first rotating body 106 to rotate in the reverse direction W2 by a predetermined rotation angle.

If switching operation and origin-finding operation are performed including a range of delayed transmission of the rotation of the second gear 107 to the first rotating body 106, as in the present embodiment, the rotation angle of the switching operation and the origin-finding operation is set including a rotation angle of delay by the pivotal movement angle ψ.

Flow Passage Switching Operation

Figure 25:
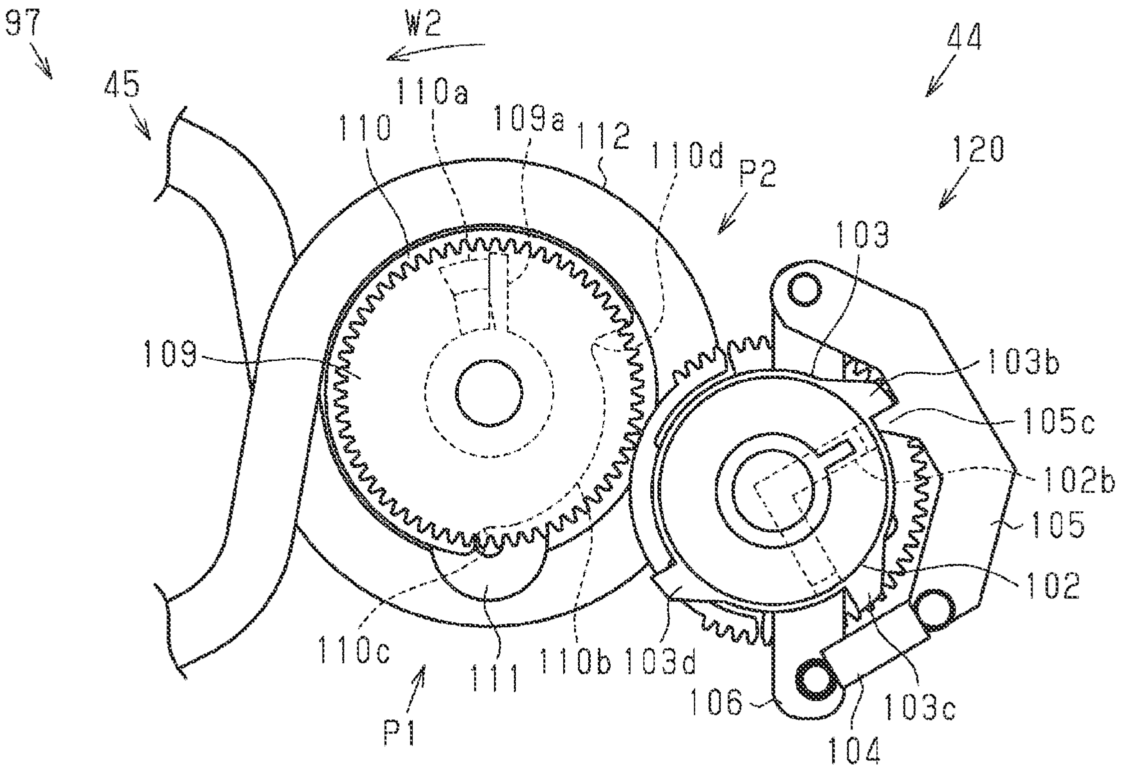
FIG. 25 is a front view illustrating a state in which flow passage switching operation starts.

As illustrated in FIG. 25, the driving gear 109 is stationary in a state in which the second engagement portion 109*a* is in engagement with the to-be-engaged portion 110*a* toward the reverse direction W2 or in a state in which the second engagement portion 109*a* is slightly away on the forward-directional W1 side from the to-be-engaged portion 110*a*. FIG. 25 illustrates the following state: in the flow passage switching mechanism 44, the origin-finding operation is performed after the rotation of the driving gear 109 in the reverse direction W2 in the state illustrated in FIG. 24, and the engagement portion 105*c* has come into engagement with the convex portion 103*b* by performing the second operation in the origin-finding operation. Flow passage switching operation and pump suction operation are started from this state.

The bearing portion 110*b* has an end portion 110*c* and an end portion 110*d*. The position of the roller 111 illustrated in FIG. 25 when the shaft 111*a* is in contact with the end portion 110*c* is a pushing position P1 where the tube 112 is pushed. The position of the roller 111 when the shaft 111*a* is in contact with the end portion 110*d* is a release position P2 where the pushing against the tube 112 is released. The shape of the bearing portion 110*b* is configured such that the roller 111 will push the tube 112 when the roller 111 is located at the pushing position P1 and such that the roller 111 will release the pushing against the tube 112 when the roller 111 is located at the release position P2.

In the state illustrated in FIG. 25, the roller 111 does not necessarily have to be located at the pushing position P1; for example, the roller 111 may be located at the release position P2. In the state illustrated in FIG. 25, the roller 111 may be located at any position on its round orbit with respect to the center of rotation RC2. Moreover, in the state illustrated in FIG. 25, the rotational position of to-be-engaged portion 110*a* may be any position. Namely, the rotational position of the driving gear 109 may be any position. In the pump 45, it is sufficient as long as the driving gear 109 is stationary in a state in which the second engagement portion 109*a* is in engagement with the to-be-engaged portion 110*a* toward the reverse direction W2 or in a state in which the second engagement portion 109*a* is slightly away from the to-be-engaged portion 110*a* in the forward direction W1.

Figure 26:
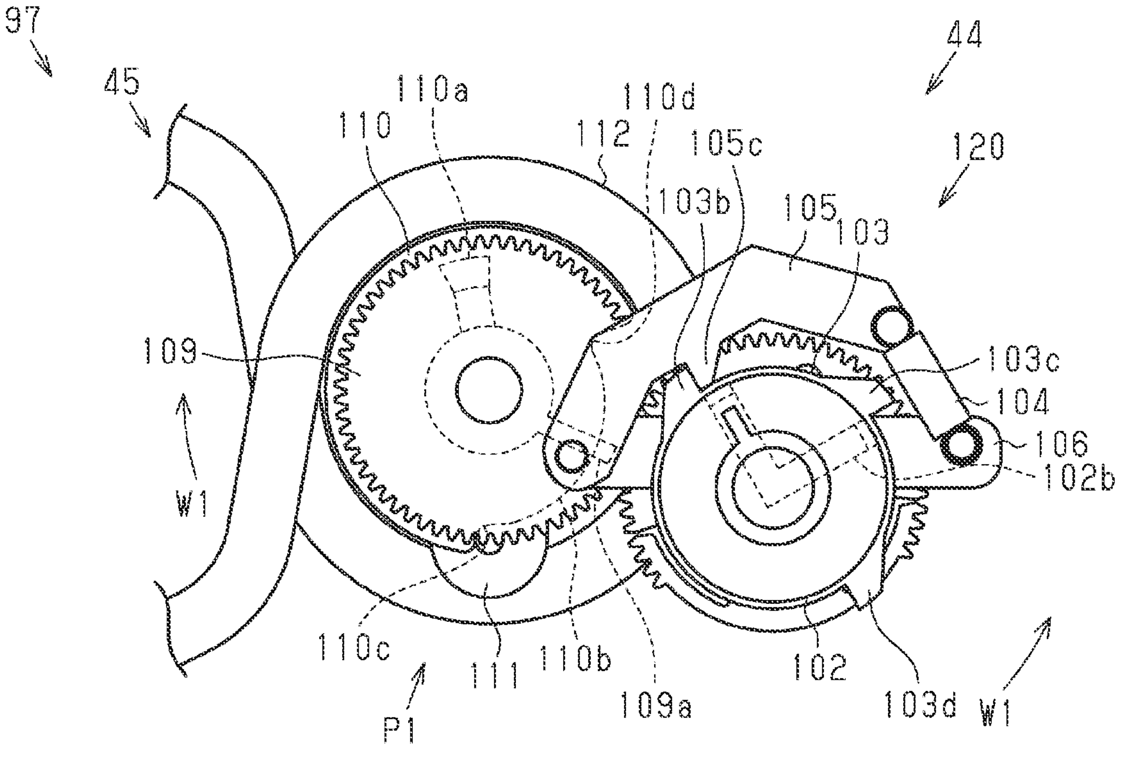
FIG. 26 is a front view illustrating a state of forward rotation of the first rotating body in the flow passage switching operation.

As illustrated in FIG. 26, the flow passage switching mechanism 44 includes the switching mechanism 120 configured to receive a driving force via the driving gear 109 and capable of switching the flow passage that is in communication with the pump 45 among a plurality of flow passages. The flow passage switching mechanism 44 switches the flow passage by causing the switching mechanism 120 to perform the switching operation described earlier. When the driving gear 109 rotates in the forward direction W1, the first rotating body 106 located at the position illustrated in FIG. 25 rotates in the forward direction W1. When this forward rotation is performed, the switching operation is performed including a range of delayed transmission of the rotation of the second gear 107 to the first rotating body 106; therefore, the rotation angle is set including a rotation angle of delay by the pivotal movement angle ψ. For example, if the angle of flow passage switching is 90° and if the pivotal movement angle ψ is 24°, the second rotating body 103 rotates together with the first rotating body 106 by 90° when the first gear 108 rotates by 114°. By this rotation, it is possible to switch the flow passage that is in communication with the pump 45 among the plurality of flow passages 101*c* and 101*d*.

As illustrated in FIG. 26, the forward direction W1 of rotation of the driving gear 109 is a direction in which the second engagement portion 109*a* goes away from the to-be-engaged portion 110*a*. Therefore, this rotation does not cause the rotation of the pump driving shaft 110. For this reason, suction operation by the pump 45 is not performed.

Figure 27:
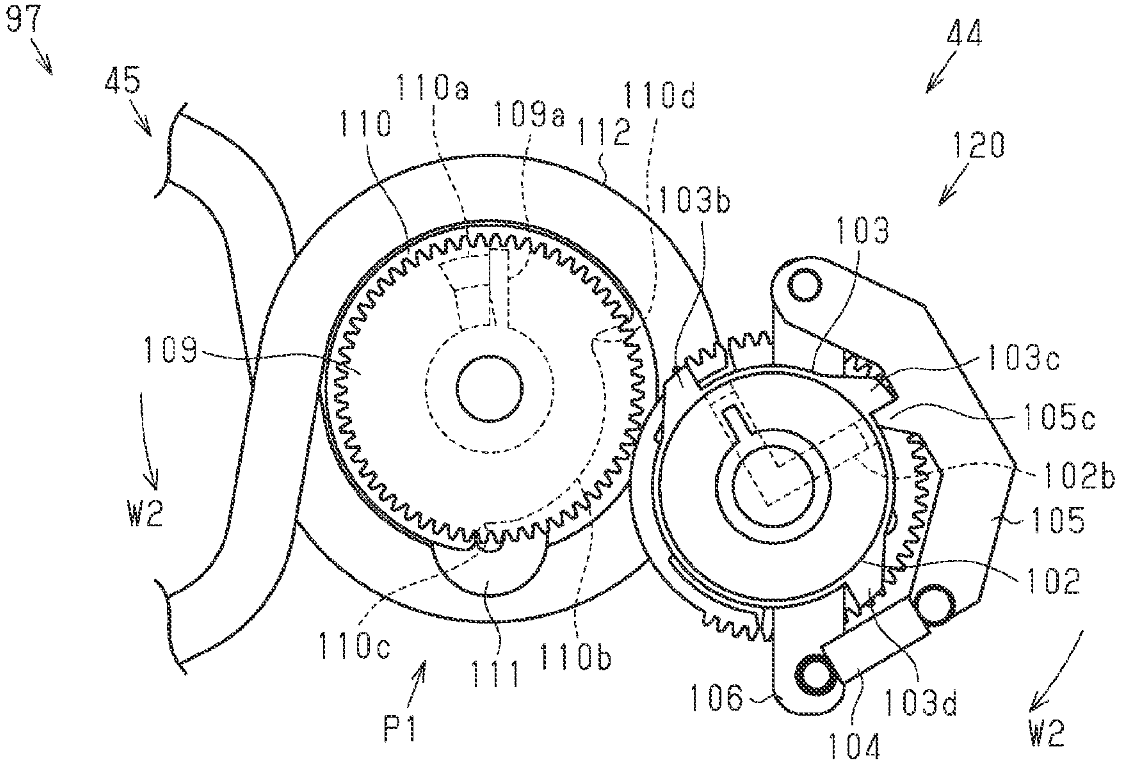
FIG. 27 is a front view illustrating a state of reverse rotation of the first rotating body in the flow passage switching operation.

As illustrated in FIG. 27, when the driving gear 109 rotates in the reverse direction W2, the first rotating body 106 rotates in the reverse direction W2. Also in this reverse rotation, the switching operation is performed including a range of delayed transmission of the rotation of the second gear 107 to the first rotating body 106; therefore, the rotation angle is set including a rotation angle of delay by the pivotal movement angle ψ. By performing forward-and-reverse rotational operation, the switching mechanism 120 causes the second rotating body 103 to rotate to a predetermined rotational position and causes a change from a state in which the engagement portion 105*c* is in engagement with the convex portion 103*b* as illustrated in FIGS. 25 and 26 to a state in which the engagement portion 105*c* is in engagement with the convex portion 103*c* as illustrated in FIG. 27.

As illustrated in FIG. 27, the reverse direction W2 of rotation of the driving gear 109 is a direction in which the second engagement portion 109*a* comes closer to the to-be-engaged portion 110*a*. However, since the rotation angle of the reverse rotation in switching operation is the same as the rotation angle of the forward rotation in the switching operation, the second engagement portion 109*a* returns to its original position where the second engagement portion 109*a* was located before the forward rotation. That is, the pump driving shaft 110 does not rotate. For this reason, suction operation by the pump 45 is not performed also when the reverse rotation is performed. That is, the driving gear 109, which is an example of a driving rotating body, performs forward rotation and reverse rotation in a region where the second engagement portion 109*a* is not in engagement with the to-be-engaged portion 110*a*, thereby switching the flow passage that is in communication with the first flow passage 101*b*.

Pump Suction Operation

Figure 28:
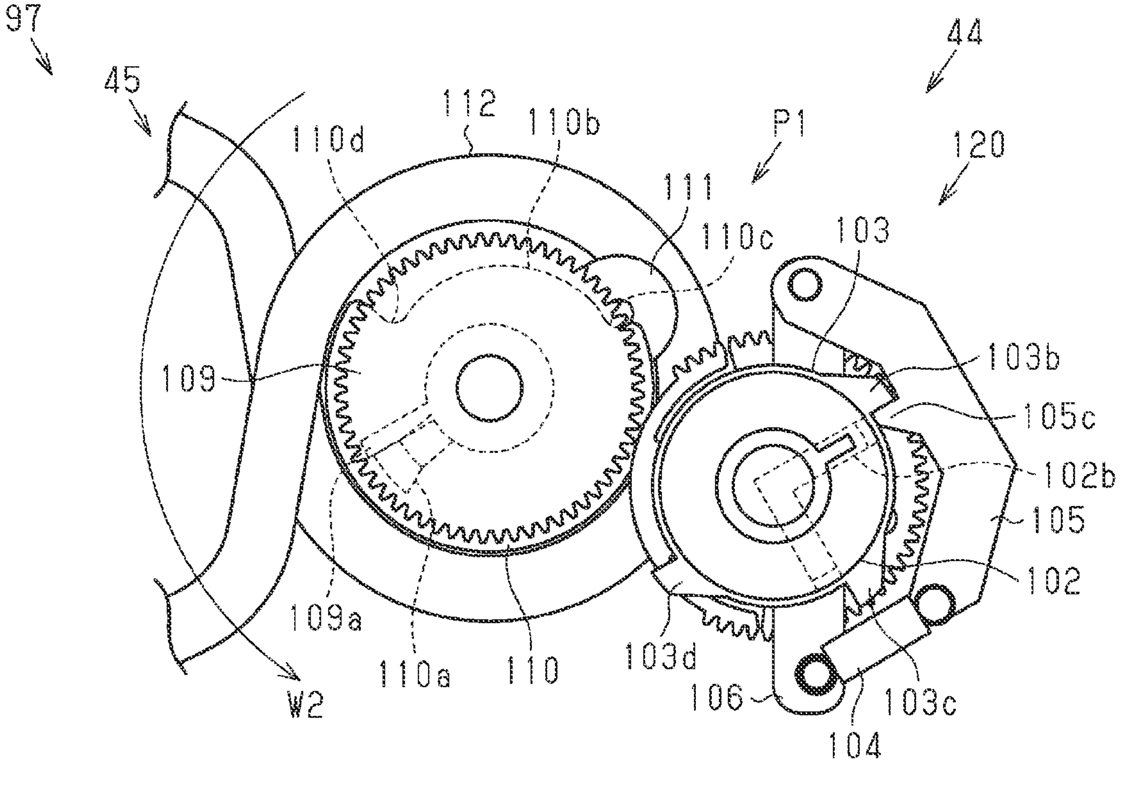
FIG. 28 is a front view illustrating pump suction operation.

As illustrated in FIG. 28, the flow passage switching mechanism 44 performs pump suction operation. The pump suction operation is started from the state illustrated in FIG. 25. As illustrated in FIG. 28, since the teeth 106*e* of the first rotating body 106 are not in engagement with the teeth 109*e* of the driving gear 109, when the driving gear 109 rotates in the reverse direction W2, the friction clutch 117 slips; therefore, the driving gear 109 alone rotates in the reverse direction W2. That is, the connection between the driving gear 109, which is an example of a driving rotating body, and the first rotating body 106 is disconnected while the pump 45 is driven. To ensure the disconnection, a stopper that does not allow unwanted reverse rotation may be provided on the first rotating body 106. For example, a projection may be provided on the first rotating body 106, and the projection may be configured to come into abutment with a projection provided on the housing 101. This structure makes it possible to stop the first rotating body 106 reliably.

As illustrated in FIG. 28, the driving gear 109 rotates in the reverse direction W2 in a state in which the second engagement portion 109*a* is in engagement with the to-be-engaged portion 110*a*. Therefore, the pump driving shaft 110 rotates in the reverse direction W2 together with the driving gear 109. Since the pump driving shaft 110 rotates while the roller 111 remains located at the pushing position P1, the roller 111 goes around the center of rotation RC2 along the tube 112 while causing the rotation of the roller 111 itself, with the tube 112 pushed by the roller 111. In the state illustrated in FIG. 25, if the roller 111 is located at the release position P2, the roller 111 receives a force of resilience for bringing the shape of the tube 112 back into its original shape and therefore moves to the pushing position P1, together with the rotation of the pump driving shaft 110. When this happens, liquid present inside the tube 112 on the reverse-directional W2 side with respect to the pushing position P1 of the roller 111 is pressurized, whereas negative pressure acts on liquid present inside the tube 112 on the forward-directional W1 side with respect to the pushing position P1 of the roller 111. That is, the suction device 97 utilizes the pump 45 as its negative pressure source to apply negative pressure to the first flow passage 101*b* connected to the discharge collection flow passage 46, thereby sucking the liquid present inside the tube 112.

Pump Release Operation

Figure 29:
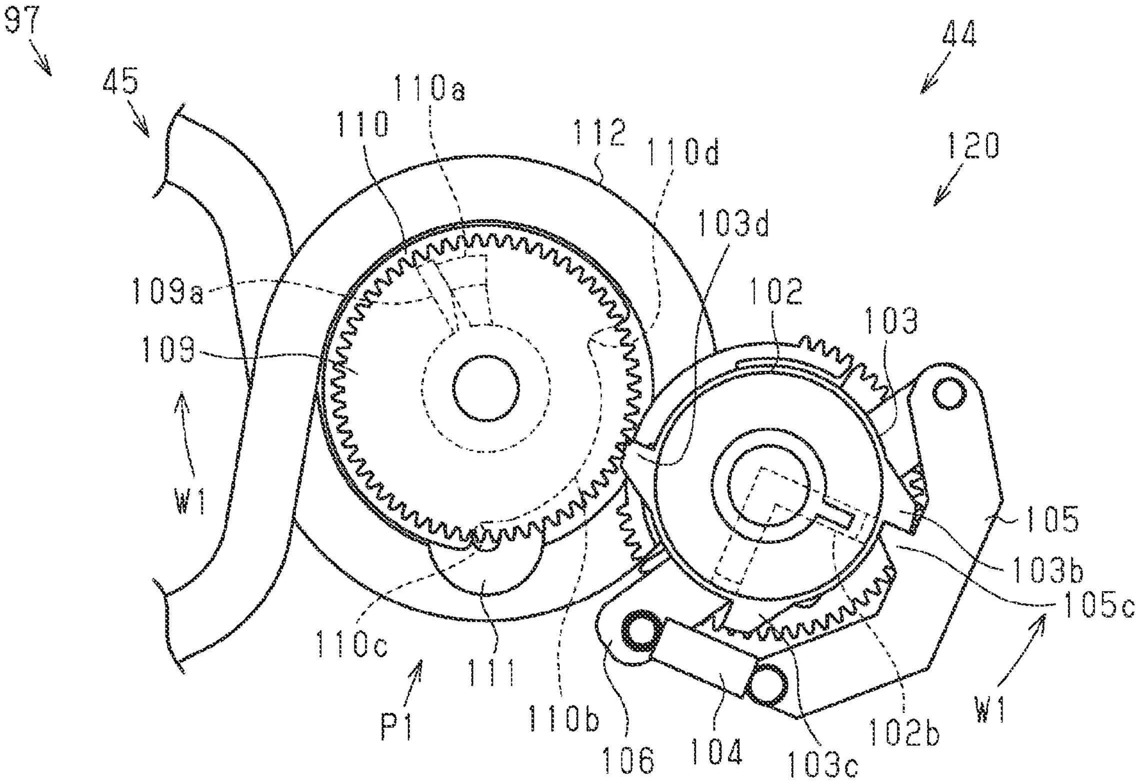
FIG. 29 is a front view illustrating a state in which the first rotating body has moved to a pump release operation position.

As illustrated in FIG. 29, the flow passage switching mechanism 44 performs pump release operation. The pump release operation is started after the end of the pump suction operation in the state illustrated in FIG. 28. As illustrated in FIG. 29, due to the rotation of the driving gear 109 in the forward direction W1, the first rotating body 106 rotates in the forward direction W1 to a rotational position where the end tooth 106*i* illustrated in FIG. 16 does not mesh with any tooth 109*e*.

Though the forward direction W1 of rotation of the driving gear 109 is a direction in which the second engagement portion 109*a* goes away from the to-be-engaged portion 110*a*, the rotation of the driving gear 109 in the forward direction W1 brings the second engagement portion 109*a* into engagement with the to-be-engaged portion 110*a* toward the forward direction W1.

Figure 30:
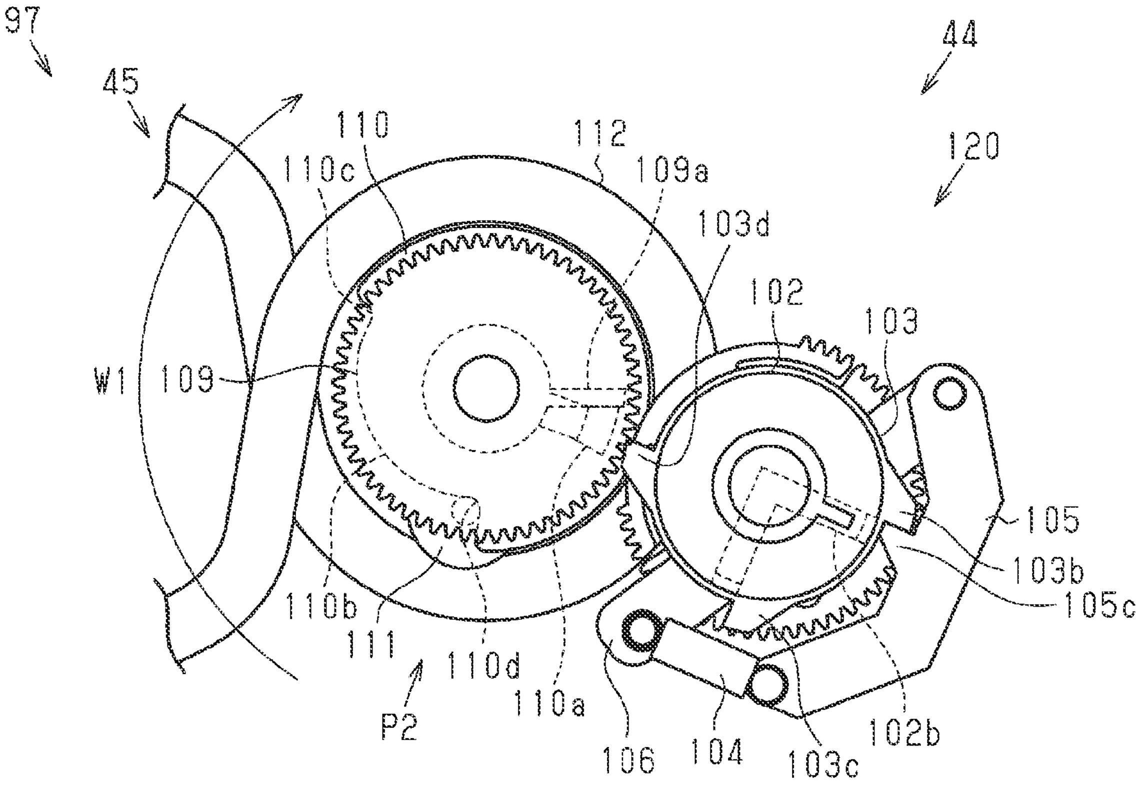
FIG. 30 is a front view illustrating pump release operation.

As illustrated in FIG. 30, even after the driving gear 109 rotates in the forward direction W1 to an angular extent that the end tooth 107*i* does not mesh with any tooth 109*e*, the driving gear 109 further rotates in the forward direction W1. Since the teeth 106*e* of the first rotating body 106 are not in engagement with the teeth 109*e* of the driving gear 109, when the driving gear 109 further rotates in the forward direction W1, the friction clutch 117 slips; therefore, the driving gear 109 alone rotates in the forward direction W1.

Since the driving gear 109 rotates in the forward direction W1 in a state in which the second engagement portion 109*a* is in engagement with the to-be-engaged portion 110*a*, the pump driving shaft 110 rotates in the forward direction W1 together with the driving gear 109. The roller 111 receives a force of resilience for bringing the shape of the tube 112 back into its original shape and therefore moves to the release position P2; the roller 111 goes around the center of rotation RC2 along the tube 112 while causing the rotation of the roller 111 itself, with the pushing against the tube 112 released. That is, the pump 45 is released.

Figure 31:
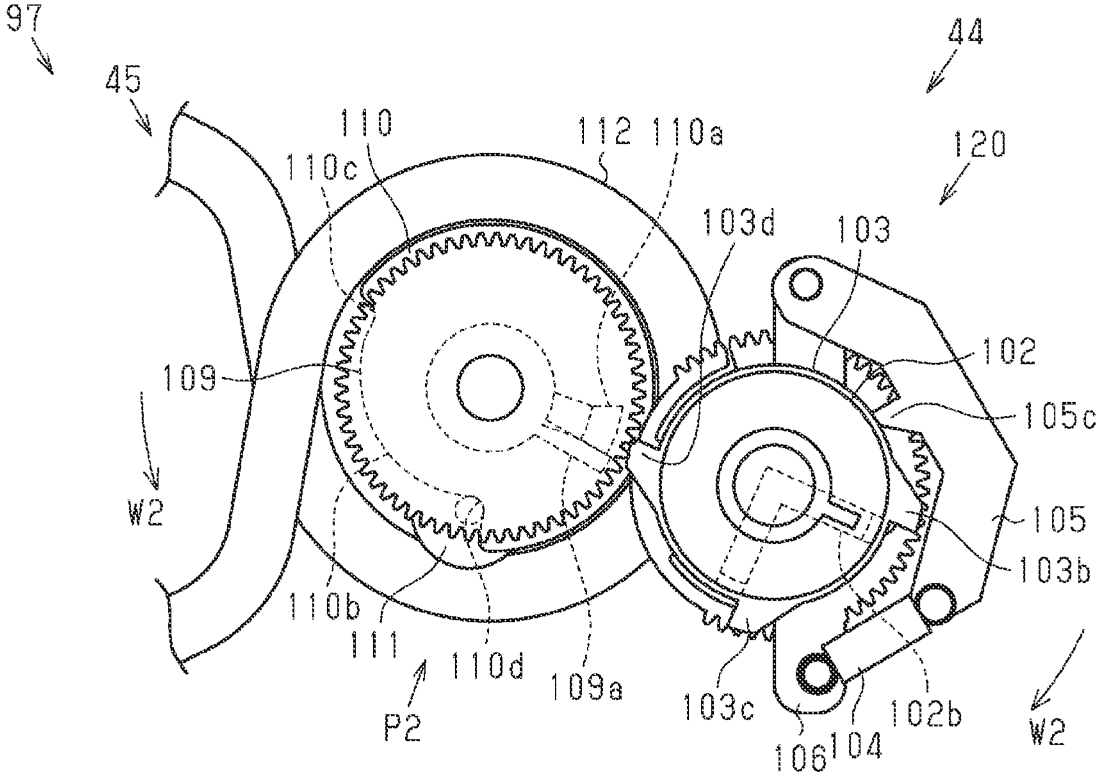
FIG. 31 is a front view illustrating a state of returning from the pump release operation position to an operation start position.

As illustrated in FIG. 31, since the driving gear 109 rotates in the reverse direction W2, the first rotating body 106 located at the position illustrated in FIG. 30 rotates in the reverse direction W2. More specifically, the rotation of the driving gear 109 is transmitted to the second gear 107 via the first gear 108 and the friction clutch 117. Then, the rotation of the driving gear 109 becomes directly transmittable to the second gear 107 due to the meshing of the driving gear 109 with the second gear 107. Then, the second gear 107 that is in meshing engagement with the driving gear 109 tows the first rotating body 106 to cause the first rotating body 106 to rotate in the reverse direction W2 in a state in which the rotation of the first rotating body 106 is delayed by an amount corresponding to a rotation angle that is equal to the pivotal movement angle ψ. Then, the rotation of the driving gear 109 becomes directly transmittable to the first rotating body 106 due to the meshing of the driving gear 109 with the first rotating body 106. Then, the first rotating body 106 rotates in the reverse direction W2 to a predetermined rotational position illustrated in FIG. 31. By the rotation of the driving gear 109 in the reverse direction W2 by a predetermined rotational angle in the state illustrated in FIG. 30 in this way, it is possible to cause the first rotating body 106 to rotate to a rotational position illustrated in FIG. 25.

The reverse direction W2 of rotation of the driving gear 109 is a direction in which the second engagement portion 109*a* goes away from the to-be-engaged portion 110*a*. Therefore, this rotation does not cause the rotation of the pump driving shaft 110. For this reason, suction operation by the pump 45 is not performed. The rotation angle is set such that the driving gear 109 will be stationary in a state in which the second engagement portion 109*a* is in engagement with the to-be-engaged portion 110*a* toward the reverse direction W2 or in a state in which the second engagement portion 109*a* is slightly away from the to-be-engaged portion 110*a*. Since the rotation of the second gear 107 is transmitted to the first rotating body 106 with a delay, the rotation angle is set including a rotation angle of delay by the pivotal movement angle ψ.

In the pump release operation, when the first rotating body 106 rotates in the forward direction W1 to the rotational position illustrated in FIG. 29, the second rotating body 103 also rotates in the forward direction W1 and, therefore, the rotational position of the rotary valve 102 is also switched. Then, when the first rotating body 106 rotates in the reverse direction W2 to the rotational position illustrated in FIG. 31, the second rotating body 103 does not rotate because the engagement portion 105*c* moves along the outer circumference 103*e* of the second rotating body 103. This makes the rotational position of the rotary valve 102 configured to rotate together with the second rotating body 103 unknown. Therefore, the origin-finding operation is performed after the pump release operation is performed.

Operation of Embodiment

How the present embodiment works will now be explained.

When the multifunction printer 11 is powered on, first, pump release operation is performed. In the flow passage switching mechanism 44, the driving portion 119 causes the driving gear 109 to rotate in the forward direction W1 continuously. Since the driving gear 109 keeps rotating in the forward direction W1, the first rotating body 106 rotates in the forward direction W1 to the rotational position illustrated in FIG. 30. The first rotating body 106 stops rotating at this position, and the driving gear 109 alone keeps rotating in the forward direction W1. Since the driving gear 109 keeps rotating in the forward direction W1, the roller 111 moves to the release position P2.

By the rotation of the driving gear 109 in the reverse direction W2 by a predetermined rotational angle in a state in which the first rotating body 106 is located at the rotational position illustrated in FIG. 30, it is possible to cause the first rotating body 106 to rotate to the rotational position illustrated in FIG. 25. The reverse direction W2 of rotation of the driving gear 109 is a direction in which the second engagement portion 109*a* goes away from the to-be-engaged portion 110*a*. Therefore, the pump driving shaft 110 does not rotate. For this reason, the roller 111 remains located at the release position P2. Then, the driving gear 109 stops in a state in which the second engagement portion 109*a* is in engagement with the to-be-engaged portion 110*a* toward the reverse direction W2 or in a state in which the second engagement portion 109*a* is slightly away from the to-be-engaged portion 110*a* as illustrated in FIG. 25.

The flow passage switching mechanism 44 performs the origin-finding operation in a state in which the first rotating body 106 is located at the rotational position illustrated in FIG. 25. More specifically, the flow passage switching mechanism 44 performs the first operation of putting the engagement portion 105*c* into the first interval S1 and the second operation of, starting from a state in which the engagement portion 105*c* is located within the first interval S1, positioning the second rotating body 103 to a predetermined rotational position.

In the first operation, the driving source 114 causes the first rotating body 106 to perform forward-and-reverse rotational operation repeatedly by a rotation angle that is smaller than the first angle θ1 and is not smaller than the second angle θ2, thereby causing the second rotating body 103 to rotate until the engagement portion 105*c* is positioned into the first interval S1.

The rotation angle in the first operation is smaller than the first angle θ1. Therefore, in a case where the engagement portion 105*c* is located within the first interval S1, no matter how many times the first operation is performed, the engagement portion 105*c* will never go out of the first interval S1, meaning that the engagement portion 105*c* will remain located within the first interval S1.

The rotation angle in the first operation is not smaller than the second angle θ2. Therefore, in a case where the engagement portion 105*c* is located within the second interval S2, which is an example of "other interval", when the first operation is performed once, the engagement portion 105*c* will go out of this second interval S2 to be positioned into any interval located on the reverse-directional W2 side with respect to this second interval S2.

If the interval into which the engagement portion 105*c* is positioned is the first interval S1, no matter how many times the first operation is thereafter performed, the engagement portion 105*c* will never go out of the first interval S1, meaning that the engagement portion 105*c* will remain located within the first interval S1.

If the interval into which the engagement portion 105*c* is positioned is the second interval S2, in the next first operation, the engagement portion 105*c* will go out of this second interval S2 to be positioned into any interval located on the reverse-directional W2 side with respect to this second interval S2.

The driving source 114 executes the first operation repeatedly. More specifically, the driving source 114 causes the first rotating body 106 to repeat the first operation by the number of times of repetition that is greater than or equal to a number obtained by subtracting one from the number of the convex portions provided on the outer circumference 103*e*. By this means, it is possible to position the engagement portion 105*c* into the first interval S1. The number of times of repetition may be defined as the number of times of performing the first operation, which is an example of forward-and-reverse rotational operation involving forward rotation performed once and reverse rotation performed once.

Since the first operation is forward-and-reverse rotational operation in a direction in which the second engagement portion 109*a* goes away from the to-be-engaged portion 110*a*, the pump driving shaft 110 does not rotate. For this reason, the roller 111 keeps located at the release position P2 while the first operation is performed.

With the engagement portion 105*c* located within the first interval S1, in the second operation, the driving source 114 causes the first rotating body 106 to perform forward-and-reverse rotational operation by a predetermined rotation angle that is not smaller than the first angle θ1 to switch the rotational position of the second rotating body 103 into a predetermined rotational position.

The rotation angle in the second operation is not smaller than the first angle θ1. Therefore, during forward rotation, the engagement portion 105*c* pushes the convex portion 103*d*, which is the forward-directional-side one of the two convex portions 103*b* and 103*d* constituting the first interval S1, thereby moving the second rotating body 103. The rotation angle in the second operation is set to be an angular value for rotating the second rotating body 103 to a predetermined rotational position; therefore, it is possible to cause the second rotating body 103 to move to the targeted position just by performing forward-and-reverse rotational operation once. By this means, it is possible to bring a flow passage different from the first flow passage 101*b* into communication with the first flow passage 101*b*.

Since the rotation angle in the second operation is not smaller than the first angle θ1, when the second operation is performed once, the engagement portion 105*c* will go out of the first interval S1 to be positioned into any interval located on the reverse-directional W2 side with respect to the first interval S1. The rotation angle in the second operation is set to be an angular value for rotating the second rotating body 103 to a predetermined rotational position and bringing the engagement portion 105*c* into engagement with a predetermined convex portion.

Similarly to the first operation, the second operation is forward-and-reverse rotational operation in a direction in which the second engagement portion 109*a* goes away from the to-be-engaged portion 110*a*; therefore, the pump driving shaft 110 does not rotate. For this reason, the roller 111 keeps located at the release position P2 also while the second operation is performed.

Also in the switching operation, which is performed thereafter with this state taken as the origin of the rotary valve 102, the pump driving shaft 110 does not rotate because it is forward-and-reverse rotational operation in a direction in which the second engagement portion 109*a* goes away from the to-be-engaged portion 110*a*. For this reason, the roller 111 keeps located at the release position P2 also while the switching operation is performed thereafter.

When negative pressure applied from the pump 45 is to be introduced into the reservoir chamber 51 of the liquid reservoir unit 50 via the air bubble discharging mechanism BS, the flow passage switching mechanism 44 brings the first flow passage 101*b* and the second flow passage 101*c* into communication with each other by performing the origin-finding operation, thereby bringing the pump 45 and the branch flow passage 96 into communication with each other. Then, after the end of the second operation in the origin-finding operation, the flow passage switching mechanism 44 causes the driving gear 109 to rotate in the reverse direction W2. Since the friction clutch 117 slips, the driving gear 109 alone rotates in the reverse direction W2 while the first rotating body 106 remains stationary. Then, pump suction operation is performed.

Since the driving gear 109 rotates in the reverse direction W2 in a state in which the second engagement portion 109*a* is in engagement with the to-be-engaged portion 110*a*, the pump driving shaft 110 rotates in the reverse direction W2 together with the driving gear 109. The pump driving shaft 110 rotates, with the roller 111 moved to the pushing position P1 due to the resilience of the tube 112. The tube 112 is pushed, and negative pressure acts on liquid present inside the tube 112 on the reverse-directional W2 side with respect to the pushing position P1 of the roller 111. Due to the action of the negative pressure, liquid present inside the branch flow passage 96 that is in communication with the inside of the tube 112 is sucked. That is, liquid containing air bubbles inside the air bubble discharging mechanism BS is sent to the waste liquid container 47 through the discharge collection flow passage 46 connected to the pump 45.

When negative pressure applied from the pump 45 is to be introduced into a closed space formed between the cap 41 and the nozzle surface 30*a*, the flow passage switching mechanism 44 brings the first flow passage 101*b* and the third flow passage 101*d* into communication with each other by performing the origin-finding operation, thereby bringing the pump 45 and the discharge flow passage 42 into communication with each other. The pump 45 is driven, with the liquid ejecting unit 30 capped. Negative pressure acts on liquid present inside the tube 112. Due to the action of the negative pressure, liquid present inside the discharge flow passage 42 that is in communication with the inside of the tube 112 is sucked. That is, liquid ejected or discharged from the nozzles 31 of the liquid ejecting unit 30 is sent to the waste liquid container 47 through the discharge collection flow passage 46 connected to the pump 45.

The pump release operation is performed after the end of the pump suction operation. In the pump release operation, when the first rotating body 106 rotates in the forward direction W1 to the rotational position illustrated in FIG. 29, the second rotating body 103 also rotates in the forward direction W1 and, therefore, the rotational position of the rotary valve 102 is also switched. Then, when the first rotating body 106 rotates in the reverse direction W2 to the rotational position illustrated in FIG. 31, the second rotating body 103 does not rotate because the engagement portion 105*c* moves along the outer circumference 103*e* of the second rotating body 103. Since the rotational position of the rotary valve 102 configured to rotate together with the second rotating body 103 becomes unknown as a result, the origin-finding operation is performed after the pump release operation is performed.

The pump release operation is performed also when the flow passage switching mechanism 44 stops its operation before completion due to the occurrence of an unexpected error, etc. By performing the pump release operation, it is possible to return the state of the flow passage switching mechanism 44 to a state in which the pump 45 is released. By performing the origin-finding operation, it is possible to return the state of the flow passage switching mechanism 44 to a state in which the second rotating body 103 configured to rotate together with the rotary valve 102 is located at a predetermined rotational position.

Effects of Embodiment

Effects of the present embodiment will now be explained.

The following effects can be obtained from the switching mechanism 120, the flow passage switching mechanism 44, and the liquid ejecting apparatus 12 according to the present embodiment.

(1) The driving source 114 causes the first rotating body 106 to perform forward-and-reverse rotational operation repeatedly by a rotation angle that is smaller than the first angle θ1 and is not smaller than the second angle θ2, thereby positioning the engagement portion 105*c* into the first interval S1. The central angle formed with respect to the center of rotation RC1 by the two convex portions 103*b* and 103*d* forming the first interval S1 is defined as the first angle θ1. A central angle formed with respect to the center of rotation RC1 by two convex portions forming the second interval S2 is defined as the second angle θ2. The rotation angle in the forward-and-reverse rotational operation is smaller than the first angle θ1. Therefore, in a case where the engagement portion 105*c* is located within the first interval S1, no matter how many times the forward-and-reverse rotational operation is performed, the engagement portion 105*c* will never go out of the first interval S1, meaning that the engagement portion 105*c* will remain located within the first interval S1. The rotation angle in the forward-and-reverse rotational operation is not smaller than the second angle θ2. Therefore, in a case where the engagement portion 105*c* is located within the second interval S2, the engagement portion 105*c* will be positioned into any interval located on the reverse-directional W2 side due to the execution of the forward-and-reverse rotational operation. Repetitive execution of the forward-and-reverse rotational operation puts the engagement portion 105*c* into the first interval S1. That is, even when the rotational position of the second rotating body 103 becomes unknown due to an unexpected event, it is possible to position the second rotating body 103 into the first interval S1 by causing the first rotating body 106 to perform the forward-and-reverse rotational operation repeatedly by the rotation angle described above, without any need for using a position detector.

(2) The driving source 114 causes the first rotating body 106 to repeat the forward-and-reverse rotational operation by the number of times of repetition that is greater than or equal to a number obtained by subtracting one from the number of the convex portions provided on the outer circumference 103*e*. In a case where the engagement portion 105*c* is located within the second interval S2, the engagement portion 105*c* will be positioned into any interval located on the reverse-directional W2 side due to the execution of the forward-and-reverse rotational operation. The number of times of repetition for putting the engagement portion 105*c* into the first interval S1 will be the largest in a case where the engagement portion 105*c* is located within the remotest other interval that is most distant from the first interval S1 on the reverse-directional W2 side. Also in this case, when the first rotating body 106 performs the forward-and-reverse rotational operation repeatedly by the number of times of repetition that is greater than or equal to a number obtained by subtracting one from the number of the convex portions provided on the outer circumference 103*e* of the second rotating body 103, the engagement portion 105*c* is put into the first interval S1. That is, by causing the first rotating body 106 to perform the forward-and-reverse rotational operation repeatedly by the number of times of repetition that is greater than or equal to a number obtained by subtracting one from the number of the convex portions provided on the outer circumference 103*e* of the second rotating body 103, it is possible to position the second rotating body 103 into the first interval S1.

(3) With the engagement portion 105*c* located within the first interval S1, the driving source 114 causes the first rotating body 106 to perform forward-and-reverse rotational operation by a predetermined rotation angle that is not smaller than the first angle θ1. Since the rotation angle is not smaller than the first angle θ1, during forward rotation, the engagement portion 105*c* pushes the convex portion 103*d*, which is the forward-directional-side one of the two convex portions 103*b* and 103*d* constituting the first interval S1, thereby moving the second rotating body 103. The rotation angle is set to be an angular value for rotating the second rotating body 103 to a predetermined rotational position; therefore, it is possible to cause the second rotating body 103 to rotate to the targeted rotational position just by performing forward-and-reverse rotational operation once. That is, it is possible to shorten the switching time.

(4) The first rotating body 106 includes the first urging member 104 that urges the engagement portion 105*c* toward the outer circumference 103*e* of the second rotating body 103. Therefore, it is possible to prevent the engagement portion 105*c* from becoming not in contact with the outer circumference 103*e* of the second rotating body 103.

(5) In the switching mechanism 120 described above, the engagement portion 105*c* pushes a predetermined convex portion while being in engagement with the predetermined convex portion during the forward rotation, thereby causing the second rotating body 103 to rotate to the targeted rotational position. By this means, it is possible to bring the plurality of convex portions 103*b*, 103*c*, and 103*d* of the second rotating body 103 to predetermined positions respectively. Since the rotary valve 102 configured to rotate together with the second rotating body 103 is positioned to a predetermined rotational position, any one of the two or more flow passages different from the first flow passage 101*b* becomes in communication with the first flow passage 101*b*. That is, it is possible to switch the flow passage that is in communication with the first flow passage 101*b* by the switching mechanism 120 described above.

(6) Since the first rotating body 106 receives a driving force transmitted from the driving source 114 via the driving gear 109, it is possible to perform pump driving and flow passage switching just by using the driving force supplied from the single driving source 114. That is, it is possible to simplify the configuration of the apparatus.

(7) The pump 45 is driven by rotation of the driving gear 109 in a state in which the second engagement portion 109*a* is in engagement with the to-be-engaged portion 110*a*. The connection between the driving gear 109 and the first rotating body 106 is disconnected while the pump 45 is driven. Therefore, the flow passage switching mechanism 44 is unable to switch the flow passage while the pump 45 is driven. Therefore, it is possible to prevent the flow passage from being switched during the driving of the pump 45.

(8) The driving gear 109 performs forward rotation and reverse rotation in a region where the second engagement portion 109*a* is not in engagement with the to-be-engaged portion 110*a*, thereby switching the flow passage that is in communication with the first flow passage 101*b*. That is, it is possible to switch the flow passage in a rotational range of the driving gear 109 where the pump 45 is not driven. Therefore, it is possible to prevent the pump 45 from being driven while the flow passage is switched.

(9) In the liquid ejecting apparatus 12, the flow passage switching mechanism 44 described above is connected to the branch flow passage 96, which is connected to the middle of the supply flow passage 27 through which liquid is supplied to the liquid ejecting unit 30, and the discharge flow passage 42, which is connected to the cap 41 capable of forming a closed space for the orifices of the nozzles 31. Because of this structure, in the liquid ejecting apparatus 12, it is possible to perform switching among a state in which the pump 45 sucks liquid from the nozzles 31 through the discharge flow passage 42, a state in which the pump 45 sucks liquid from the supply flow passage 27, and a state in which the pump 45 is released.

Second Embodiment

With reference to the accompanying drawings, a second embodiment of the present disclosure will now be explained. Since the second embodiment is almost the same as the first embodiment, the same reference numerals are assigned to the same components as those of the first embodiment, and an explanation of them is not given here.

Figure 32:
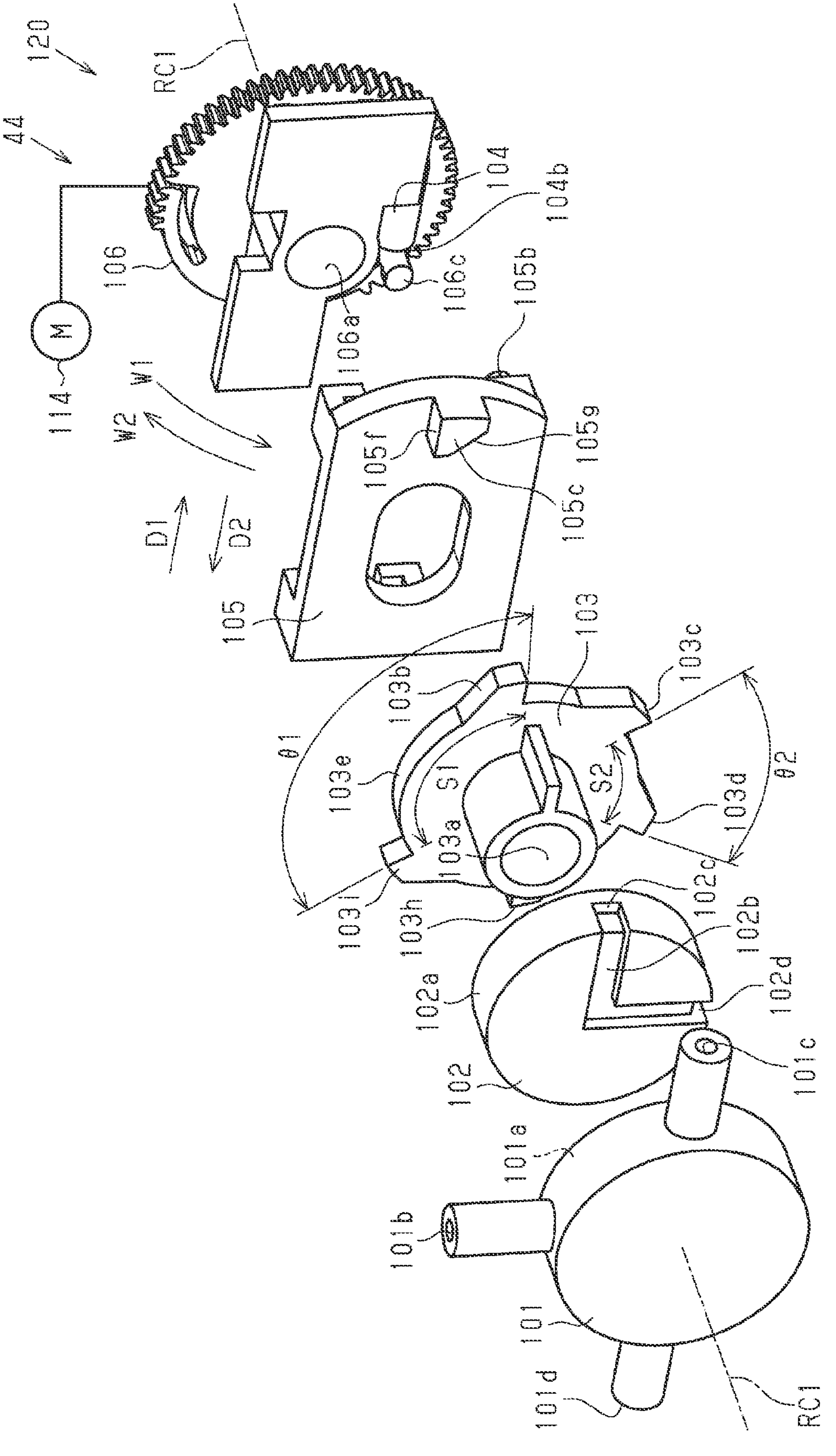
FIG. 32 is an exploded perspective view illustrating the structure of a flow passage switching mechanism according to the second embodiment.

As illustrated in FIG. 32, the switching mechanism 120 includes the second rotating body 103 that rotates around the center of rotation RC1 of the first rotating body 106 and has a plurality of convex portions provided on its outer circumference 103*e* at intervals in the direction of rotation. In the present embodiment, five convex portions 103*b*, 103*c*, 103*d*, 103*h*, and 103*i* are provided on the outer circumference 103*e* of the second rotating body 103 at intervals, including the second intervals S2, in the direction of rotation.

The first rotating body 106 includes an engagement member 105. The engagement member 105 has an engagement portion 105*c*. The engagement member 105 is able to move in a sliding manner in the direction D1, in which the engagement portion 105*c* goes away from the center of rotation RC1, and the direction D2, in which the engagement portion 105*c* comes closer to the center of rotation RC1. The first rotating body 106 includes the first urging member 1 that urges the engagement portion 105*c* toward the outer circumference 103*e* of the second rotating body 103.

In the present embodiment, the second angle θ2 is formed to be different from a central angle formed with respect to the center of rotation RC1 by the first flow passage 101*b* and by a flow passage different from the first flow passage 101*b*. When the first rotating body 106 rotates in the forward direction W1 in the second operation, for example, the rotary valve 102 rotates in the forward direction W1 together with the second rotating body 103 in a state in which, for example, the engagement portion 105*c* is in engagement with the convex portion 103*i* of the second rotating body 103. The rotation angle in the second operation is set to be an angular value for rotating the rotary valve 102 together with the second rotating body 103 to a predetermined rotational position when the convex portion 103*i* comes to a predetermined position by the forward rotation. With this setting, the flow passage switching mechanism 44 brings a predetermined flow passage into communication with the first flow passage 101*b*. In the second operation in the origin-finding operation, the flow passage switching mechanism 44 may bring another flow passage into communication with the first flow passage 101*b* by further performing the origin-finding operation from this state.

The rotary valve 102 may include five flow passages including a first flow passage, and the five convex portions 103*b*, 103*c*, 103*d*, 103*h*, and 103*i* may be provided at respective positions corresponding to the switching positions of the rotary valve 102. The rotary valve 102 is configured such that the outer circumferential surface 102*a* will block the flow passages except for the one that is in communication with the first flow passage 101*b* when the rotary valve 102 rotated together with the second rotating body 103 comes to a predetermined rotational position, and it is possible to provide communication between the first flow passage 101*b* and the predetermined one of these flow passages.

Operation and Effects of Embodiment

The operation and effects of the second embodiment are the same as the operation and effects of the first embodiment. Therefore, an explanation of them is omitted.

Modification Examples of Embodiments

The foregoing embodiments may be modified as described below. The foregoing embodiments and the following modification examples may be combined with one another as long as they are not technically contradictory to one another.

The number of the convex portions of the second rotating body 103 is not limited. It is sufficient as long as the plurality of convex portions of the second rotating body 103 forms the first interval S1 and other interval(s) smaller than the first interval S1. It is sufficient as long as there are at least two convex portions.

A plurality of first intervals S1 may exist. In this case, in the first operation, the driving source 114 drives the first rotating body 106 to repeat forward-and-reverse rotational operation by the number of times of repetition that is greater than or equal to a number obtained by subtracting one from the largest number of the convex portions provided successively on the outer circumference 103*e* in the second interval S2 as the other interval. By this means, it is possible to position the engagement portion 105*c* into the first interval S1.

There may be a third interval that is smaller than the second interval S2. Even if there is a third interval, it is sufficient as long as convex portions are provided on the second rotating body 103 such that any one of two or more flow passages different from the first flow passage 101*b* becomes in communication with the first flow passage 101*b* when the convex portions of the second rotating body 103 come to respective predetermined positions. Since the third interval is smaller than the second interval S2, a central angle formed with respect to the center of rotation RC1 by two convex portions forming the second interval S2 is larger than a central angle formed with respect to the center of rotation RC1 by two convex portions forming the third interval. Therefore, even if there is a third interval that is smaller than the second interval S2, the second angle θ2 is the largest one of central angles formed with respect to the center of rotation RC1 by respective two convex portions forming other intervals.

The first rotating body 106 does not necessarily have to have the teeth 106*e*. In the present embodiment, the driving gear 109 causes the first rotating body 106 to rotate by the meshing of the teeth 106*e* of the first rotating body 106 with the teeth 109*e* of the driving gear 109 in a state in which the first rotating body 106 is towed by the second gear 107 that is already in meshing engagement with the driving gear 109. However, since the first rotating body 106 is already rotating by being towed by the second gear 107, the first rotating body 106 may continue rotating by being towed by the second gear 107, without such direct meshing. This means that the teeth 106*e* of the first rotating body 106 may be omitted.

What is claimed is:

1. A switching mechanism, comprising:

a first rotating body that performs forward rotation and reverse rotation by receiving a driving force transmitted from a driving source; and a second rotating body that rotates around a center of rotation of the first rotating body and has a plurality of convex portions provided on an outer circumference at intervals in a direction of rotation; wherein the first rotating body has an engagement portion configured to move along the outer circumference of the second rotating body, when the first rotating body rotates in a forward direction, engagement of the engagement portion with the convex portion causes rotation of the second rotating body in the forward direction together with the first rotating body, when the first rotating body rotates in a reverse direction, the engagement portion moves along the outer circumference of the second rotating body so that the second rotating body does not rotate in the reverse direction, a rotational position of the second rotating body is switched into a predetermined rotational position by causing the first rotating body, driven by the driving source, to execute forward-and-reverse rotational operation, in which forward rotation and reverse rotation are performed sequentially, a first interval, which is at least one of the intervals, is larger than other intervals, a central angle formed with respect to the center of rotation by two convex portions forming the first interval is defined as a first angle, and largest one of central angles formed with respect to the center of rotation by respective two convex portions forming the other intervals is defined as a second angle, and given above definition, the driving source causes the first rotating body to perform forward-and-reverse rotational operation repeatedly by a rotation angle that is smaller than the first angle and is not smaller than the second angle, thereby positioning the engagement portion into the first interval.

2. The switching mechanism according to claim 1, wherein the driving source causes the first rotating body to perform the forward-and-reverse rotational operation repeatedly by a number of times of repetition that is greater than or equal to a number obtained by subtracting one from a number of the convex portions, thereby positioning the engagement portion into the first interval.

3. The switching mechanism according to claim 1, wherein, with the engagement portion located within the first interval, the driving source causes the first rotating body to perform the forward-and-reverse rotational operation by a predetermined rotation angle that is not smaller than the first angle, thereby switching a rotational position of the second rotating body in a predetermined rotational position.

4. The switching mechanism according to claim 1, wherein the first rotating body includes a first urging member that urges the engagement portion toward the outer circumference of the second rotating body.

5. A flow passage switching mechanism, comprising:

the switching mechanism according to claim 1; and a rotary valve including a first flow passage and two or more flow passages different from the first flow passage and configured to, by rotating, switch a flow passage that is in communication with the first flow passage between or among the two or more flow passages different from the first flow passage; wherein the rotary valve is configured to rotate together with the second rotating body, and when a predetermined convex portion among the plurality of convex portions of the second rotating body comes to a predetermined position, any one of the two or more flow passages different from the first flow passage becomes in communication with the first flow passage.

6. The flow passage switching mechanism according to claim 5, further comprising:

a pump whose one end is in communication with the first flow passage; and a driving rotating body that drives the pump by receiving the driving force transmitted from the driving source; wherein the first rotating body receives the driving force transmitted from the driving source via the driving rotating body.

7. The flow passage switching mechanism according to claim 6, wherein the driving rotating body has a second engagement portion, the pump has a to-be-engaged portion configured to be engaged with the second engagement portion in a direction of rotation, the pump is driven by rotation of the driving rotating body in a state in which the second engagement portion is in engagement with the to-be-engaged portion, and connection between the driving rotating body and the first rotating body is disconnected while the pump is driven.

8. The flow passage switching mechanism according to claim 7, wherein the driving rotating body performs forward rotation and reverse rotation in a region where the second engagement portion is not in engagement with the to-be-engaged portion, thereby switching a flow passage that is in communication with the first flow passage.

9. A liquid ejecting apparatus, comprising:

a liquid ejecting unit that ejects liquid from nozzles;

a supply flow passage through which the liquid is suppled from a liquid container containing the liquid to the liquid ejecting unit;

a cap configured to enclose the nozzles to form a closed space for the nozzles inside;

a branch flow passage whose one end is connected to a middle of the supply flow passage;

a discharge flow passage whose one end is connected to the cap;

a driving source; and the flow passage switching mechanism according to claim 6; wherein other end of the branch flow passage is connected to a second flow passage among the two or more flow passages different from the first flow passage, and other end of the discharge flow passage is connected to a third flow passage among the two or more flow passages different from the first flow passage.

* * * * *